(12) United States Patent
Zheng et al.

(10) Patent No.: US 12,051,441 B2
(45) Date of Patent: Jul. 30, 2024

(54) MULTI-REGISTER-BASED SPEECH DETECTION METHOD AND RELATED APPARATUS, AND STORAGE MEDIUM

(71) Applicant: Tencent Technology (Shenzhen) Company Limited, Shenzhen (CN)

(72) Inventors: Jimeng Zheng, Shenzhen (CN); Lianwu Chen, Shenzhen (CN); Weiwei Li, Shenzhen (CN); Zhiyi Duan, Shenzhen (CN); Meng Yu, Shenzhen (CN); Dan Su, Shenzhen (CN); Kaiyu Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/944,067

(22) Filed: Sep. 13, 2022

(65) Prior Publication Data
US 2023/0013740 A1    Jan. 19, 2023

Related U.S. Application Data

(63) Continuation of application No. PCT/CN2021/100472, filed on Jun. 17, 2021.

(30) Foreign Application Priority Data

Jul. 27, 2020   (CN) .......................... 202010732649.8

(51) Int. Cl.
*G10L 25/84*     (2013.01)
*G06T 7/20*      (2017.01)
(Continued)

(52) U.S. Cl.
CPC ................ *G10L 25/84* (2013.01); *G06T 7/20* (2013.01); *G10L 17/02* (2013.01); *G10L 17/22* (2013.01);
(Continued)

(58) Field of Classification Search
CPC .......... G10L 25/84; G10L 17/02; G10L 17/22; G10L 21/028; G10L 25/21; G10L 2021/02087; G10L 2021/02166
See application file for complete search history.

(56) References Cited

U.S. PATENT DOCUMENTS 10,540,960 B1 *   1/2020   Jones ..................... G06N 20/00
10,937,441 B1 *   3/2021   Kristjansson ....... G10L 21/0264
(Continued)

FOREIGN PATENT DOCUMENTS

CN           1813284 A     8/2006
CN         101297587 A    10/2008
(Continued)

OTHER PUBLICATIONS

Tencent Technology, WO, PCT/CN2021/100472, Sep. 15, 2021, 6 pgs.

(Continued)

*Primary Examiner* — Douglas Godbold
(74) *Attorney, Agent, or Firm* — Morgan, Lewis & Bockius LLP

(57) ABSTRACT

This application discloses a multi-sound area-based speech detection method and related apparatus, and a storage medium, which is applied to the field of artificial intelligence. The method includes: obtaining sound area information corresponding to N sound areas including multiple users speaking simultaneously; generating a control signal corresponding to each target detection sound area according to user information corresponding to the target detection sound area; processing multi-user speech input signals by using the control signals, to obtain a speech output signal corresponding to each target detection sound area; generating a speech detection result of the target detection sound area according to the speech output signal corresponding to the target detection sound area; and selecting, among the multiple (Continued)

users, a main speaker based on the user information, the speech output signals and speech detection results of multiple users in the N sound areas.

20 Claims, 11 Drawing Sheets

(51) Int. Cl.
 G10L 17/02 (2013.01)
 G10L 17/22 (2013.01)
 G10L 21/028 (2013.01)
 G10L 25/21 (2013.01)
(52) U.S. Cl.
 CPC ............ *G10L 21/028* (2013.01); *G10L 25/21* (2013.01); *G06T 2207/30201* (2013.01)

(56) References Cited

U.S. PATENT DOCUMENTS

| | | | |
|---|---|---|---|
| 11,107,492 B1* | 8/2021 | Chu | H04R 3/005 |
| 11,114,108 B1* | 9/2021 | Maalouli | G10L 25/51 |
| 11,341,988 B1* | 5/2022 | Pishehvar | G10L 25/30 |
| 11,404,073 B1* | 8/2022 | Zhang | G10L 21/0216 |
| 2005/0111674 A1 | 5/2005 | Hsu | |
| 2007/0010997 A1 | 1/2007 | Kim | |
| 2015/0172830 A1* | 6/2015 | Liu | G02C 11/06 381/313 |
| 2019/0311718 A1* | 10/2019 | Huber | H04R 27/00 |
| 2019/0341053 A1* | 11/2019 | Zhang | H04L 12/1827 |
| 2019/0341055 A1* | 11/2019 | Krupka | G10L 17/02 |
| 2020/0058293 A1* | 2/2020 | Zhang | G10L 15/063 |
| 2020/0105253 A1* | 4/2020 | Yazu | H04R 3/04 |
| 2020/0126581 A1* | 4/2020 | Chintala | G10L 21/0264 |
| 2020/0154200 A1* | 5/2020 | McCowan | H04R 1/406 |
| 2021/0074316 A1* | 3/2021 | Souden | G10L 15/25 |
| 2021/0217182 A1* | 7/2021 | Li | G06N 3/044 |
| 2021/0327447 A1* | 10/2021 | Maeng | H04R 1/406 |
| 2021/0390952 A1* | 12/2021 | Masnadi-Shirazi | G10L 15/20 |
| 2022/0013123 A1* | 1/2022 | Xu | G10L 15/25 |

FOREIGN PATENT DOCUMENTS

| | | |
|---|---|---|
| CN | 107910006 A | 4/2018 |
| CN | 108370470 A | 8/2018 |
| CN | 109192203 A | 1/2019 |
| CN | 110211585 A | 9/2019 |
| CN | 110310633 A | 10/2019 |
| CN | 110459234 A | 11/2019 |
| CN | 110475180 A | 11/2019 |
| CN | 110491403 A | 11/2019 |
| CN | 110797051 A | 2/2020 |
| CN | 111223497 A | 6/2020 |
| CN | 111341313 A | 6/2020 |
| CN | 111833899 A | 10/2020 |
| EP | 1116961 A2 | 7/2001 |
| EP | 2011366 B1 | 4/2012 |
| KR | 19980037190 A | 8/1998 |

OTHER PUBLICATIONS

Tencent Technology, IPRP, PCT/CN2021/100472, Jan. 31, 2023, 7 pgs.
GuoBin Ou, et al., "Speaker Identification Using Speech and Lip Features", Proceedings of International Joint Conference on Neural Networks, Canada, Jul. 31, 2005, vol. 4, XP031213385, 6 pgs.
Tencent Technology, Extended European Search Report, EP21850172.4, Mar 6, 2023, 9 pgs.
Tencent Technology, ISR, PCT/CN2021/100472, Sep. 15, 2021, 3 pgs.
Yong-Eun Kim et al., "Efficient Sound Source Localization Method Using Region Selection", 2009 IEEE International Symposium on Industrial Electronics, Aug. 25, 2009, 3 pgs., Retrieved from the Internet: https://ieeexplore.ieee.org/document/5217624.

* cited by examiner

MULTI-REGISTER-BASED SPEECH DETECTION METHOD AND RELATED APPARATUS, AND STORAGE MEDIUM

CROSS-REFERENCE TO RELATED APPLICATIONS

This application is a continuation application of PCT Patent Application No. PCT/CN2021/100472, entitled "VOICE DETECTION METHOD BASED ON MULTIPLE SOUND REGIONS, RELATED DEVICE, AND STORAGE MEDIUM" filed on Jun. 17, 2021, which claims priority to Chinese Patent Application No. 202010732649.8, filed with the State Intellectual Property Office of the People's Republic of China on Jul. 27, 2020, and entitled "MULTI-REGISTER-BASED SPEECH DETECTION METHOD AND RELATED APPARATUS, AND STORAGE MEDIUM", all of which are incorporated herein by reference in their entirety.

FIELD OF THE TECHNOLOGY

This application relates to the field of artificial intelligence, and in particular, to a speech detection technology.

BACKGROUND OF THE DISCLOSURE

With the wide application of far-field speech in people's daily life, performing processing such as voice activity detection (VAD), separation, enhancement, recognition, calling, and the like on each possible sound source in a multi-sound source (or multi-user) scenario has become a bottleneck of a plurality of types of intelligent speech products in improving the voice interaction performance.

A mono pre-processing system based on a main speaker detection algorithm is designed in the conventional technical solution. The pre-processing system generally estimates a speaker having the most powerful signal energy (that is, signal energy reaching a microphone array) and an azimuth thereof by estimating the azimuth in combination with the signal strength or estimating the azimuth in combination with the spatial spectrum, and determines the speaker and the azimuth as a main speaker and an azimuth thereof.

However, when a plurality of speakers exist in the environment, since the main speaker may be farther away from the microphone array relative to an interference speaker, determining the main speaker only according to the signal strength may be flawed. Although the volume of the main speaker may be higher than the interference speaker, a speech signal of the main speaker has a greater propagation loss in the space, and a signal strength reaching the microphone array may be lower, resulting in a poor effect in subsequent speech processing.

SUMMARY

Embodiments of this application provide a multi-sound area-based speech detection method and related apparatus, and a storage medium. According to an aspect of this application, a multi-sound area-based speech detection method is provided, performed by a computer device, the method including:

obtaining sound area information corresponding to each sound area in N sound areas, the sound area information including a sound area identifier, a sound pointing angle, and user information, the sound area identifier being used for identifying a sound area, the sound pointing angle being used for indicating a central angle of the sound area, the user information being used for indicating a user existence situation in the sound area, N being an integer greater than 1;

using each sound area as a target detection sound area, and generating a control signal corresponding to the target detection sound area according to the sound area information corresponding to the target detection sound area, the control signal being used for performing suppression or retention on a speech input signal corresponding to the target detection sound area;

processing the speech input signal corresponding to the target detection sound area by using the control signal corresponding to the target detection sound area, to obtain a speech output signal corresponding to the target detection sound area; and generating a speech detection result of the target detection sound area according to the speech output signal corresponding to the target detection sound area.

According to another aspect of this application, a speech detection apparatus is provided, deployed on a computer device, the apparatus including:

an obtaining module, configured to obtain sound area information corresponding to each sound area in N sound areas, the sound area information including a sound area identifier, a sound pointing angle, and user information, the sound area identifier being used for identifying a sound area, the sound pointing angle being used for indicating a central angle of the sound area, the user information being used for indicating a user existence situation in the sound area, N being an integer greater than 1;

a generation module, configured to use each sound area as a target detection sound area, and generating a control signal corresponding to the target detection sound area according to the sound area information corresponding to the target detection sound area, the control signal being used for performing suppression or retention on a speech input signal corresponding to the target detection sound area;

a processing module, configured to process the speech input signal corresponding to the target detection sound area by using the control signal corresponding to the target detection sound area, to obtain a speech output signal corresponding to the target detection sound area; and the generation module being further configured to generate a speech detection result of the target detection sound area according to the speech output signal corresponding to the target detection sound area.

According to another aspect of this application, a computer device is provided, including: a memory, a transceiver, a processor, and a bus system, the memory being configured to store a program, the processor being configured to execute the program in the memory, and perform the method in the foregoing aspects according to instructions in program code; and the bus system being configured to connect the memory and the processor, to cause the memory and the processor to perform communication.

According to another aspect of this application, a non-transitory computer-readable storage medium is provided, the computer-readable storage medium storing instructions that, when executed by a processor of a computer, cause the computer to perform the method in the foregoing aspects.

According to another aspect of this application, a computer program product or a computer program is provided, the computer program product or the computer program including computer instructions stored in a computer-readable storage medium. A processor of a computer device reads the computer instructions from the computer-readable storage medium, and executes the computer instructions, so that the computer device performs the method provided in the various implementations in the foregoing aspects.

DESCRIPTION OF EMBODIMENTS

Embodiments of this application provide a multi-sound area-based speech detection method and related apparatus, and a storage medium. In a multi-sound source scenario, speech signals in different directions may be retained or suppressed by a control signal, so that speech of each user can be separated and enhanced in real time, thereby improving the accuracy of speech detection and improving the effect of speech processing.

It is to be understood that, the multi-sound area-based speech detection method provided in this application can perform speech recognition and semantic recognition according to a case that a plurality of users simultaneously speak, and then determine which user to respond to. A case that a plurality of users speak is likely to occur in a far-field recognition scenario. For example, a case that a plurality of user simultaneously speak may occur in a conference room, a car, or a room with a smart home, and as a result, a multi-source signal may interfere with detection. The multi-sound area-based speech detection method provided in this application can resolve the problem of signal interference existing in the foregoing scenario. For example, a case that a plurality of users in a surrounding environment simultaneously speak often occurs in a wake-up-free scenario of a smart speaker product. In view of this, according to the method provided in this application, which user to respond to is first determined, then recognition is performed on speech content of the user in terms of content and intention, and whether to respond to a voice command of the user is determined by the smart speaker product according to a recognition result.

Figure 1:
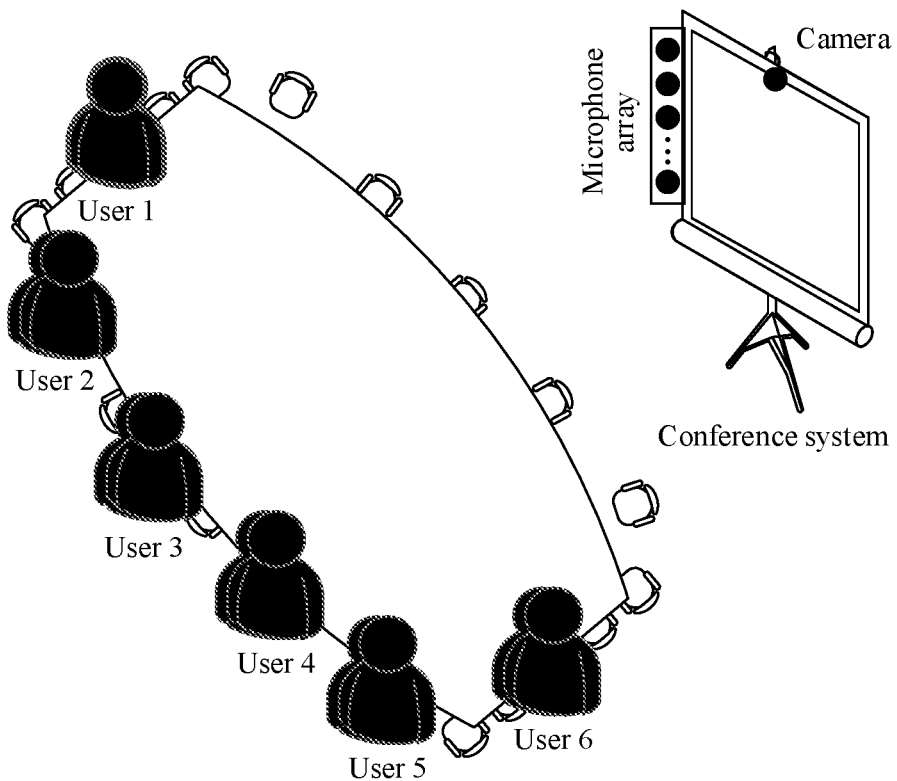
FIG. 1 is a schematic diagram of an environment of a scenario based on a multi-user conference according to an embodiment of this application.

For ease of understanding, the speech detection method provided in this application is described below with reference to a specific scenario. Referring to FIG. 1, FIG. 1 is a schematic diagram of an environment of a scenario based on a multi-user conference according to an embodiment of this application. As shown in the figure, in a far-field conference scenario, there may be a plurality of participants in a conference room at the same time, for example, a user 1, a user 2, a user 3, a user 4, a user 5, and a user 6. A conference system may include a screen, a camera, and a microphone array. The microphone array is configured to collect speech of six users, the camera is configured to capture real-time pictures of the six users, and the screen may display the pictures of the six users and display information related to the conference. For a call application, a main speaker in a conference scenario (in which there may usually be one or two main speakers) needs to be determined in real time, and speech of the main speaker is enhanced and transmitted to a remote end to which a call is connected. In addition, in the conference scenario, for a conference transcription function, whether each user speaks needs to be determined in real time, so that speech of a speaker is separated and enhanced and is transmitted to an automatic speech recognition (ASR) service module in a cloud, and speech content is recognized by using the ASK service module.

Figure 2:
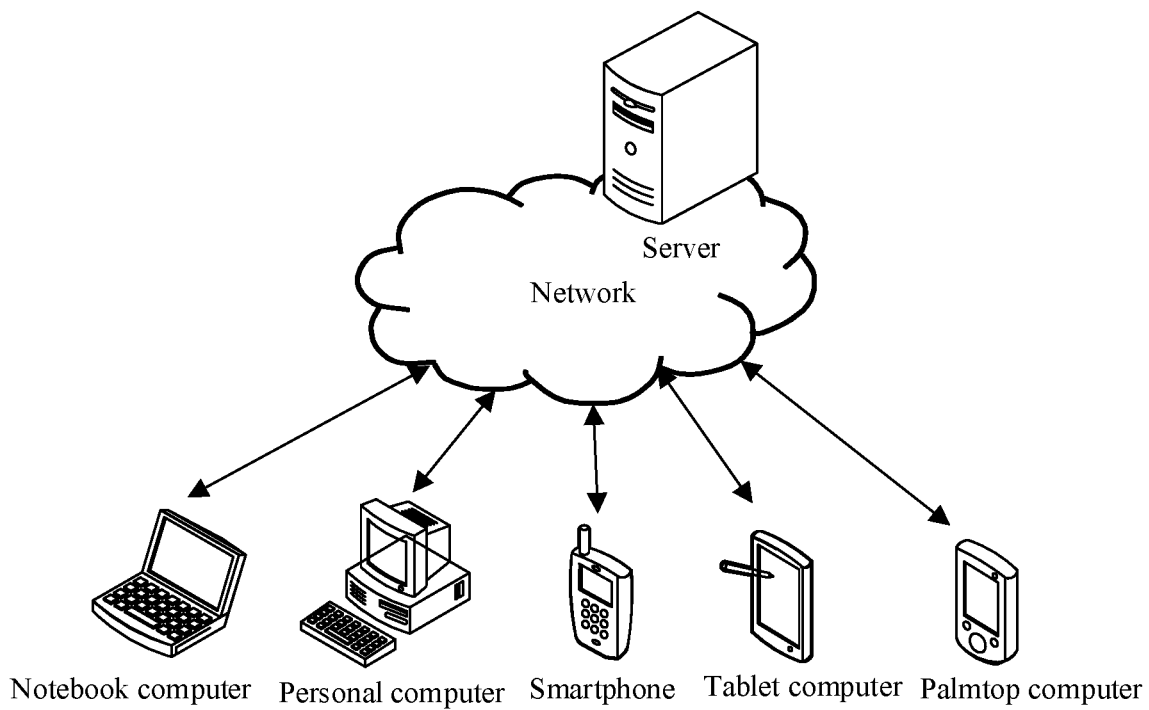
FIG. 2 is a schematic diagram of an embodiment of a speech detection system according to an embodiment of this application.

The multi-sound area-based speech detection method provided in this application is applicable to a speech detection system shown in FIG. 2. Referring to FIG. 2, FIG. 2 is a schematic diagram of an embodiment of a speech detection system according to an embodiment of this application. As shown in the figure, the speech detection system includes a server and a terminal device. The server involved in this application may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an AI platform. The terminal device may be a smart television, a smart speaker, a smartphone, a tablet computer, a notebook computer, a palmtop computer, a personal computer, or the like. This application is not limited thereto.

In the speech detection system, the terminal device may communicate with the server through a wireless network, a wired network, or a movable storage medium. The foregoing wireless network uses a standard communication technology and/or protocol. The wireless network is usually the Internet, but may alternatively be any another network, including but not limited to, a Bluetooth, a local area network (LAN), a metropolitan area network (MAN), a wide area network (WAN), or any combination of a mobile network, a dedicated network, or a virtual dedicated network. In some embodiments, custom or dedicated data communication technologies may be used in place of or in addition to the foregoing data communication technologies. The movable storage medium may be a universal serial bus (USB) flash drive, a removable hard disk, or another movable storage medium. This is not limited in this application. Although FIG. 2 merely shows five types of terminal devices, it is to be understood that, examples in FIG. 2 are merely used to understand the technical solution, and are not to be construed as a limitation on this application.

Based on the speech detection system shown in FIG. 2, the microphone array equipped on the terminal device picks up a speech signal and other sounds in an environment and then transmits a collected digital signal to a pre-processing module of the speech signal, and the pre-processing module perform processing such as extraction, enhancement, VAD detection, speaker detection, and main speaker detection on target speech. Specific processing content is flexibly determined according to a scenario and functional requirements. A speech signal enhanced by the pre-processing module may be sent to the server, and a speech recognition module or a voice call module deployed in the server processes the enhanced speech signal.

Figure 3:
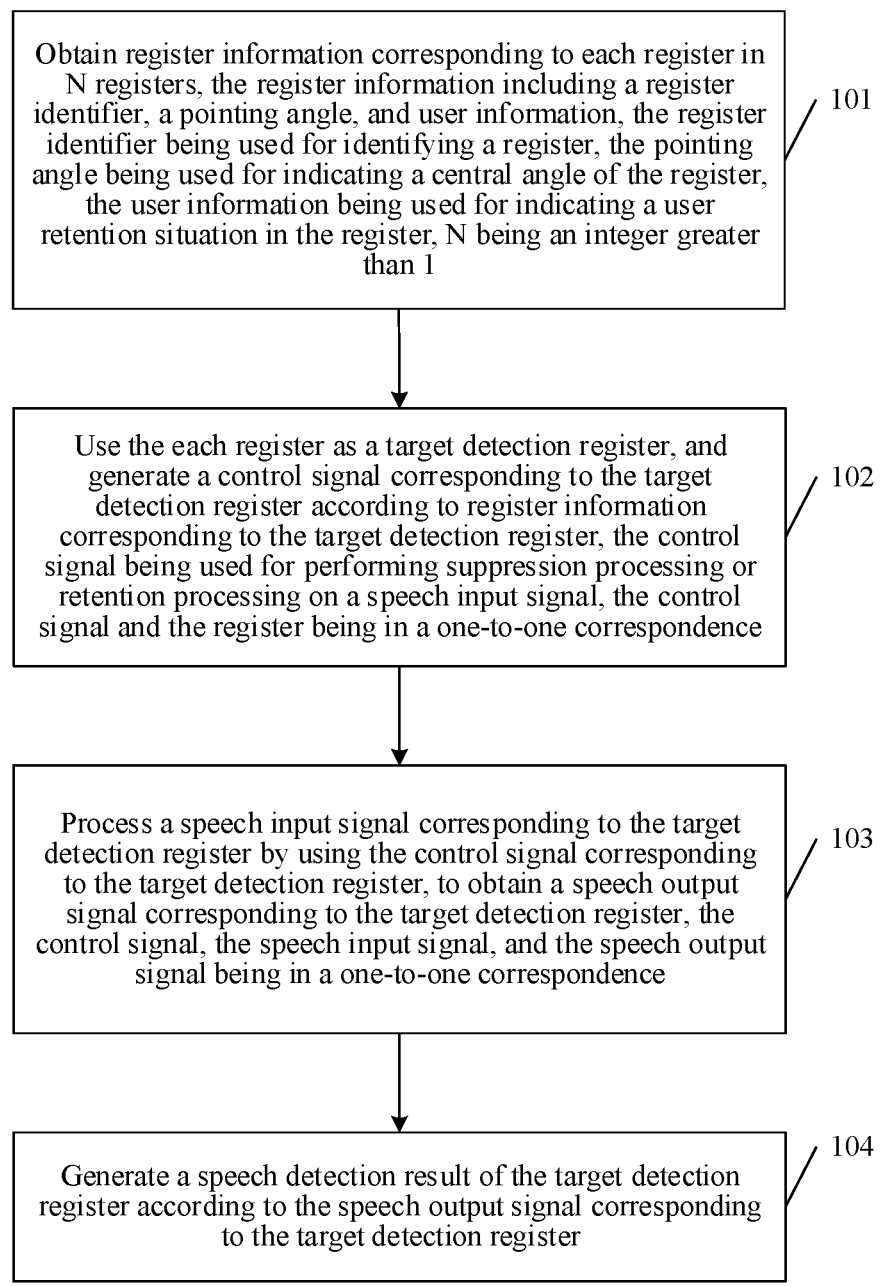
FIG. 3 is a schematic diagram of an embodiment of a multi-sound area-based speech detection method according to an embodiment of this application.

The multi-sound area-based speech detection method provided in this application is described below with reference to the foregoing description. Referring to FIG. 3, an embodiment of the multi-sound area-based speech detection method provided in the embodiments of this application includes the following steps:

101: Obtain sound area information corresponding to each sound area in N sound areas, the sound area information including a sound area identifier, a sound pointing angle, and user information, the sound area identifier being used for identifying a sound area, the sound pointing angle being used for indicating a central angle of the sound area, the user information being used for indicating a user existence situation in the sound area, N being an integer greater than 1.

Figure 4:
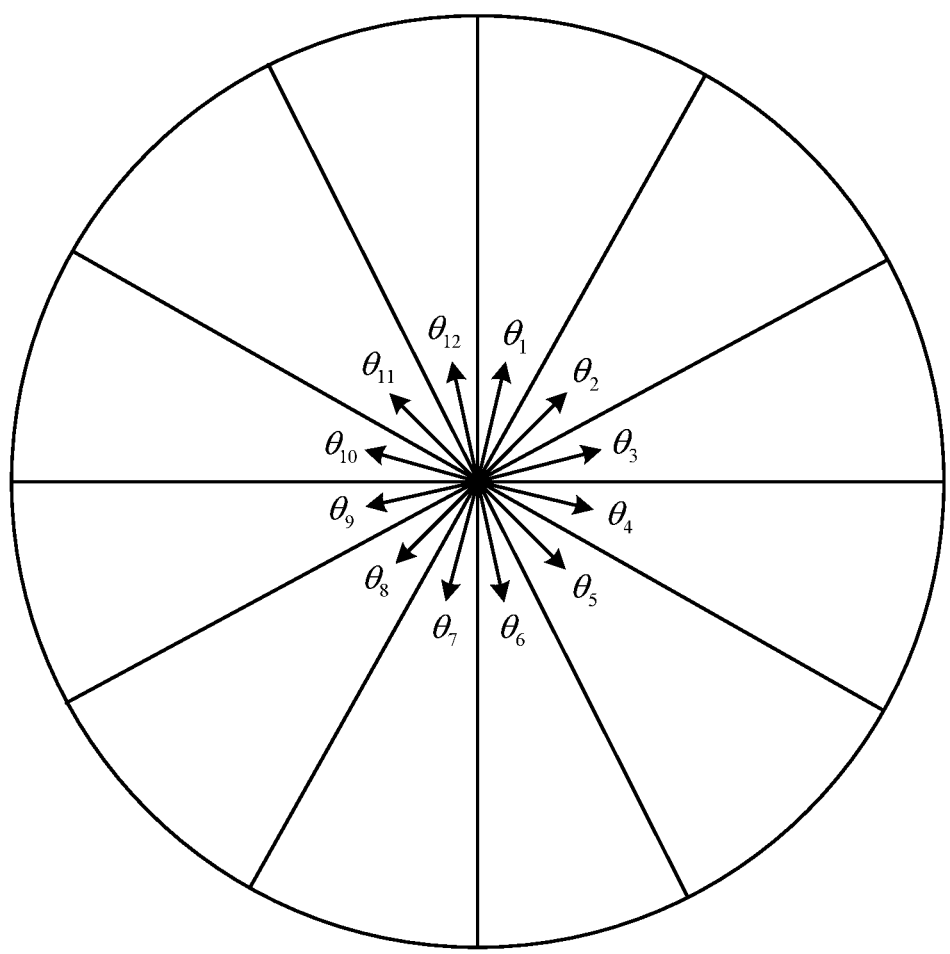
FIG. 4 is a schematic diagram of a multi-sound area division manner according to an embodiment of this application.

In this embodiment, a space within a visual range may first be divided into N sound areas. For ease of description, referring to FIG. 4, FIG. 4 is a schematic diagram of a multi-sound area division manner according to an embodiment of this application. As shown in the figure, assuming that a 360-degree space can be divided into 12 sound areas, each sound area is 30 degrees, and a central angle of the sound area is $\theta_{i=1,\ldots,N}$, for example, $\theta_1=15$ degrees, $\theta_2=45$ degrees, and $\theta_3=75$ degrees. The rest can be deduced by analogy. FIG. 4 is merely an example, in actual application, N is an integer greater than or equal to 2, such as 12, 24, 36, and the like. The division quantity differs according to the amount of computation. In addition, the space within the visual range may further be non-uniformly divided. This is not limited herein. Each sound area corresponds to one sound source, assuming that there may be two or more users in a specific sound area, such users may also be considered as a same person. Therefore, during actual sound area division, each sound area may be divided as finely as possible.

A speech detection apparatus may obtain sound area information corresponding to each sound area after the sound area division is completed. The sound area information includes a sound area identifier, a sound pointing angle, and user information, for example, sound area information of the first sound area may be represented as $\{(i, \theta, \lambda_i)\}_{i=1}$, sound area information of the second sound area may be represented as $\{(i, \theta, \lambda_i)\}_{i=2}$, and the rest can be deduced by analogy. i represents an $i^{th}$ sound area, $\theta_i$ represents a sound pointing angle corresponding to the $i^{th}$ sound area, and $\lambda_i$ represents user information corresponding to the $i^{th}$ sound area. The user information is used for indicating a user existence situation in the sound area, for example, assuming that no user exists in the $i^{th}$ sound area, $\lambda_i$ may be set to $-1$; and assuming that a user exists in the $i^{th}$ sound area, $\lambda_i$ may be set to 1.

The method provided in the embodiments of this application may be performed by a computer device, and specifically may be performed by the speech detection apparatus deployed on the computer device. The computer device may be a terminal device, or may be a server, that is, the speech detection apparatus may be deployed on the terminal device, or may be deployed on the server. Certainly, the speech detection apparatus may also be deployed in the speech detection system, that is, the speech detection apparatus may implement the method provided in this application based on a multi-channel sound pickup system.

102: Use the sound area as a target detection sound area, and generate a control signal corresponding to the target detection sound area according to sound area information corresponding to the target detection sound area, the control signal being used for performing suppression or retention on a speech input signal, the control signal and the sound area being in a one-to-one correspondence.

In this embodiment, after obtaining sound area information corresponding to each sound area in N sound areas, the speech detection apparatus may use the sound area as a target detection sound area, and generate a control signal corresponding to the target detection sound area according to sound area information corresponding to the target detection sound area, to generate a control signal corresponding to the sound area, where the control signal may suppress or retain a speech input signal obtained through the microphone array.

Assuming that it is detected that no user exists in the $i^{th}$ sound area, it indicates that a speech input signal in the sound area belongs to noise (abnormal human voice). Therefore, a control signal generated for the sound area may perform suppression on the speech input signal. Assuming that it is detected that a user exists in the $i^{th}$ sound area and a speech input signal in the sound area belongs to normal human voice, a control signal generated for the sound area may perform retention on the speech input signal.

Whether a user exists in a sound area may be detected by using a computer vision (CV) technology, or whether a user exists in a current sound area may be estimated by using a spatial spectrum.

103: Process a speech input signal corresponding to the target detection sound area by using the control signal corresponding to the target detection sound area, to obtain a speech output signal corresponding to the target detection sound area, the control signal, the speech input signal, and the speech output signal being in a one-to-one correspondence.

In this embodiment, after obtaining the control signal corresponding to the sound area from the N sound areas, the speech detection apparatus may still use the sound area as the target detection sound area, and process the speech input signal corresponding to the target detection sound area by using the control signal corresponding to the target detection sound area, to obtain the speech output signal corresponding to the target detection sound area, and in other words, suppression or retention is performed on a speech input signal in a corresponding sound area by using the control signal corresponding to the sound area, thereby outputting a speech output signal corresponding to the sound area. For example, when no user exists in the $i^{th}$ sound area, a control signal of the $i^{th}$ sound area may be "0", that is, suppression is performed on a speech input signal corresponding to the sound area. In another example, when a user normally speaking exists in the $i^{th}$ sound area, the control signal corresponding to the $i^{th}$ sound area may be "1", that is, retention is performed on the speech input signal corresponding to the sound area. Further, processing such as extraction, separation, and enhancement may be performed on the speech input signal corresponding to the sound area.

104: Generate a speech detection result of the target detection sound area according to the speech output signal corresponding to the target detection sound area.

In this embodiment, to improve the quality of the speech output signal, the speech detection apparatus may further perform post-processing on the speech output signal corresponding to the sound area, that is, use the sound area as the target detection sound area, and generate the speech detection result corresponding to the target detection sound area according to the speech output signal corresponding to the target detection sound area. For example, processing such as cross-channel post-processing and noise reduction post-processing are performed on the speech output signal corresponding to the target detection sound area, and the post-processed speech output signal is detected to finally generate a speech detection result corresponding to the sound area, and further determine to whether to respond to voice from the sound area. In some cases, the speech detection apparatus may detect whether each sound area meets a human voice matching condition, assuming that the $i^{th}$ sound area meets the human voice matching condition, a speech detection result corresponding to the $i^{th}$ sound area may be that "a user exists in the $i^{th}$ sound area". It is further assumed that the $i^{th}$ sound area does not meet the human voice matching condition, the speech detection result corresponding to the $i^{th}$ sound area is that "no user exists in the $i^{th}$ sound area".

Figure 5:
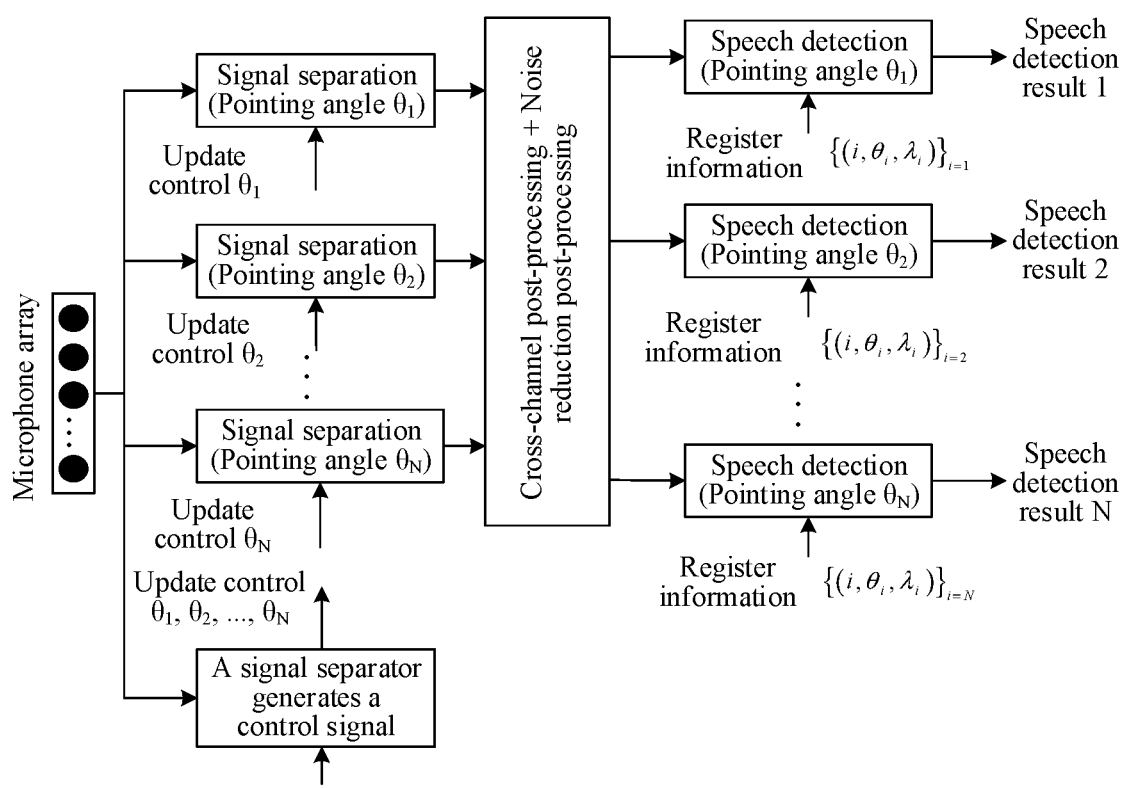
FIG. 5 is a schematic architectural diagram of a multi-channel sound pickup system according to an embodiment of this application.

In this application, speech detection may be implemented based on the multi-channel sound pickup system. Referring to FIG. 5, FIG. 5 is a schematic architectural diagram of a multi-channel sound pickup system according to an embodiment of this application. As shown in the figure, the microphone array equipped on the terminal device may pick up an audio signal corresponding to each sound area, where the audio signal includes a speech input signal and a noise signal. A control signal corresponding to each sound area is generated by a signal separator, suppression or retention is performed on a speech input signal of a corresponding sound pointing angle by using the control signal corresponding to the sound area, and then cross-channel post-processing and noise reduction post-processing are performed on each speech output signal, to obtain a target speech output signal corresponding to the sound area. Finally, a speech detection result is determined based on sound area information and the target speech output signal of each sound area, that is, a speech detection result of each sound area in N sound areas is obtained.

An embodiment of this application provides a multi-sound area-based speech detection method is provided. Firstly, sound area information corresponding to each sound area in N sound areas is obtained, the sound area information including a sound area identifier, a sound pointing angle, and user information, so that the sound area may be used as a target detection sound area, and a control signal corresponding to the target detection sound area is generated according to sound area information corresponding to the target detection sound area; then, a speech input signal corresponding to the target detection sound area is processed by using the control signal corresponding to the target detection sound area, to obtain a speech output signal corresponding to the target detection sound area; and finally a speech detection result of the target detection sound area is generated according to the speech output signal corresponding to the target detection sound area, so that the speech detection result corresponding to the sound area is obtained, thereby facilitating determining, according to the speech detection result, whether to respond to a user corresponding to the sound area. In the foregoing manner, speech signals in different directions are processed in parallel based on a plurality of sound areas, so that in a multi-sound source scenario, speech signals in different directions may be retained or suppressed by a control signal, so that speech of each user can be separated and enhanced in real time, thereby improving the accuracy of speech detection and improving the effect of subsequent speech processing.

Based on the embodiment corresponding to FIG. 3, in an exemplary embodiment provided in the embodiments of this application, the obtaining sound area information corresponding to each sound area in N sound areas may include the following steps:

detecting the sound area in the N sound areas, to obtain a user detection result corresponding to the sound area;

using the sound area as the target detection sound area, and determining user information corresponding to the target detection sound area according to a user detection result corresponding to the target detection sound area;

determining lip motion information corresponding to the target detection sound area according to the user detection result corresponding to the target detection sound area;

obtaining a sound area identifier corresponding to the target detection sound area and a sound pointing angle corresponding to the target detection sound area; and generating the sound area information corresponding to the target detection sound area according to the user information corresponding to the target detection sound area, the lip motion information corresponding to the target detection sound area, the sound area identifier corresponding to the target detection sound area, and the sound pointing angle corresponding to the target detection sound area.

A manner of obtaining sound area information based on the CV technology is described in this embodiment. Generally, a corresponding camera needs to be configured to capture a picture of the user, the camera may be covered by one wide-angle camera, and for a 360-degree space, the camera is fully covered by two or three wide-angle cameras in a spliced manner. Each user in the space may be detected and numbered by using the CV technology, and related information may further be provided, for example, user identity information, a face azimuth, lip motion information, a facial orientation, a face distance, and the like. Each sound area in N sound areas is detected, to obtain a user detection result corresponding to the sound area. The description is made in this application by using an example in which the user detection result includes user identity information and lip motion information, but this is not to be construed as a limitation on this application.

The user detection result includes user information and the lip motion information. The user information includes: whether a user exists, and whether identity information of the user can be extracted when a user exists. For example, a user exists in the second sound area, and the user is recognized and determined as "Xiao Li" whose corresponding identity is "01011". In another example, no user exists in the fifth sound area, and there is no need to perform recognition. The lip motion information indicates whether a lip of the user moves or not. Generally, the lip moves when a person is speaking. Therefore, whether the user is speaking or not may further be determined based on the lip motion information. A sound area identifier corresponding to each sound area and a sound pointing angle corresponding to the sound area may be determined with reference to pre-divided sound areas, thereby generating sound area information $\{(i, \theta_i, \lambda_i, L_i)\}_{i=1,\ldots,N}$ corresponding to the sound area. i in the sound area information $\{(i, \theta_i, \lambda_i, L_i)\}_{i=1,\ldots,N}$ represents an $i^{th}$ sound area, $\theta_i$ represents a sound pointing angle of the $i^{th}$ sound area, $\lambda_i$ represents user information of the $i^{th}$ sound area, and $L_i$ represents lip motion information of the $i^{th}$ sound area.

In addition, in this embodiment of this application, the manner of obtaining sound area information based on the CV technology is provided. In the foregoing manner, more sound area information may be detected by using the CV technology. It is equivalent that a related situation of the user in each sound area may be "saw", for example, whether a user exists, user information of the user, whether the user has lip motion, and the like, so that multi-modal information may be integrated and utilized, thereby further improving the accuracy of speech detection through information in a visual dimension, and providing a feasible manner for subsequent processing of solutions of related videos.

In some cases, based on the embodiment corresponding to FIG. 3, in another exemplary embodiment provided in the embodiments of this application, the determining user information corresponding to the target detection sound area according to a user detection result corresponding to the target detection sound area specifically includes the following steps:

determining a first identity as the user information when the user detection result corresponding to the target detection sound area is that a recognizable user exists in the target detection sound area;

determining a second identity as the user information when the user detection result corresponding to the target detection sound area is that no user exists in the target detection sound area;

determining a third identity as the user information when the user detection result corresponding to the target detection sound area is that an unknown user exists in the target detection sound area; and the determining lip motion information corresponding to the target detection sound area according to the user detection result corresponding to the target detection sound area specifically includes the following steps:

determining a first motion identifier as the lip motion information when the user detection result corresponding to the target detection sound area is that a user with lip motion exists in the target detection sound area;

determining a second motion identifier as the lip motion information when the user detection result corresponding to the target detection sound area is that a user exists in the target detection sound area and the user does not have lip motion; and determining a third motion identifier as the lip motion information when the user detection result corresponding to the target detection sound area is that no user exists in the target detection sound area.

A specific manner of extracting lip motion information and user information based on the CV technology is described in this embodiment. Since the user information and the lip motion information need to be determined according to an actual situation, user information and lip motion information in each sound area need to be detected, which is described in detail below.

First, a Recognition Manner for User Information

For ease of description, any sound area in N sound areas is used as an example to describe this application, and user information in other sound areas is determined in a similar manner, which is not described herein. Any sound area may be used as a target detection sound area, assuming that the sound area is an $i^{th}$ sound area, whether a user exists in the $i^{th}$ sound area and whether identity information of the user can be obtained when a user exists may be determined based on a user detection result of the $i^{th}$ sound area. User information corresponding to the $i^{th}$ sound area is represented as $\lambda^i$, which is represented as user information in a direction with a sound pointing angle $\theta_i$. When a user exists in the direction with the sound pointing angle $\theta_i$ and identity information of the user can be determined, it indicates that a name and identity of the user can be determined, and $\lambda_i$ is a first identity of the user, for example, "5". When no user exists in the direction with the sound pointing angle $\theta_i$, $\lambda_i$ may be set to a special value, that is, a second identity, for example, "−1". When a function of face recognition is not configured, that is, the identity information of the user cannot be determined, $\lambda_i$ may be set to another special value, that is, a third identity, for example, "0", to inform a subsequent processing module that although there is a user in the direction, the identity is unknown, and if necessary, identity information of the user may be further recognized through voiceprint recognition.

Second, a Recognition Manner for Lip Motion Information

For ease of description, any sound area in N sound areas is used as an example to describe this application, and lip motion information in other sound areas is determined in a similar manner, which is not described herein. Any sound area may be used as a target detection sound area, assuming that the sound area is an $i^{th}$ sound area, whether a user exists in the $i^{th}$ sound area and whether the user has lip motion when a user exists may be determined based on a user detection result of the $i^{th}$ sound area. The camera generally adopts an unmovable wide-angle camera, detects all people and faces within the visual range by using a CV algorithm and cuts a facial local image out, and detects, through the CV algorithm, whether an upper lip on a face is moving. Lip motion information corresponding to the $i^{th}$ sound area is represented as $L_i$, which is represented as lip motion information in a direction with a sound pointing angle $\theta_i$. When a user exists in the direction with the sound pointing angle $\theta_i$ and the user is determined to have lip motion, $L_i$ may be set to a first motion identifier, for example, "0". When a user exists in the direction with the sound pointing angle $\theta_i$ but the user does not have lip motion, $L_i$ may be set to a second motion identifier, for example, "1". When no user exists in the direction with the sound pointing angle $\theta_i$, $L_i$ may be set to a special value, that is, a third motion identifier, for example, "−1".

In addition, an embodiment of this application provides a specific manner of extracting lip motion information and user information based on the CV technology. In the foregoing manner, the user information and the lip motion information of the user can be analyzed in a plurality of aspects, the feasibility of recognition may be improved as much as possible, and information included in each sound area is analyzed in a plurality of dimensions, thereby improving the operability of the technical solution.

Based on the embodiment corresponding to FIG. 3, in another exemplary embodiment provided in the embodiments of this application, the generating a control signal corresponding to the target detection sound area according to sound area information corresponding to the target detection sound area specifically includes the following steps:

generating a first control signal when user information corresponding to the target detection sound area is used for indicating that no user exists in the target detection sound area, the first control signal belonging to the control signal, and the first control signal being used for performing suppression on the speech input signal; and generating a second control signal when the user information corresponding to the target detection sound area is used for indicating that a user exists in the target detection sound area, the second control signal belonging to the control signal, and the second control signal being used for performing retention on the speech input signal.

A manner of generating a control signal without adopting the CV technology is described in this embodiment. When the CV technology is not adopted, a user identity cannot be recognized, and lip motion information of the user cannot be obtained. In this case, whether a user exists in a current sound area may be estimated by using a spatial spectrum, so that sound area information of N sound areas is obtained, where the sound area information of the N sound areas may be represented as $\{(i, \theta_i, \lambda_i, L_i)\}_{i=1, \ldots, N}$.

For ease of description, any sound area in N sound areas is used as an example to describe this application, and a control signal in another sound area may be generated in a similar manner, which is not described herein. Any sound area may be used as a target detection sound area, assuming that the sound area is an $i^{th}$ sound area, and sound area information of the i is $\{(i, \theta_i, \lambda_i)\}$, where user information $\lambda_i$ may indicate that no exists in a direction with a sound pointing angle $\theta_i$ or a user exists in a direction with a sound pointing angle $\theta_i$, and if necessary, identity information of the user may further be recognized through voiceprint recognition, which is not described in detail herein. During the generation of the control signal, if it is detected that no user exists in the $i^{th}$ sound area, all signals at the sound pointing angle $\theta_i$ may be learned and suppressed through a signal separator, that is, a first control signal is generated through the signal separator, and all the signals at the sound pointing angle $\theta_i$ are suppressed by using the first control signal. If it is detected that a user exists in the $i^{th}$ sound area, signals at the sound pointing angle $\theta_i$ may be learned and retained through the signal separator, that is, a second control signal is generated through the signal separator, and the signals at the sound pointing angle $\theta_i$ are retained by using the second control signal.

In addition, in this embodiment of this application, the manner of generating a control signal without adopting the CV technology is provided. In the foregoing manner, the control signal can be generated only by using audio data. In this way, on the one hand, the flexibility of the technical solution is improved; and on the other hand, the control signal may also be generated based on less information, thereby saving operation resources, improving the efficiency of generating the control signal, and saving power for the device.

Based on the embodiment corresponding to FIG. 3, in another exemplary embodiment provided in the embodiments of this application, the generating a control signal corresponding to the target detection sound area according to sound area information corresponding to the target detection sound area specifically includes the following steps:

generating a first control signal when user information corresponding to the target detection sound area is used for indicating that no user exists in the target detection sound area, the first control signal belonging to the control signal, and the first control signal being used for performing suppression on the speech input signal; and generating the first control signal when the user information corresponding to the target detection sound area is used for indicating that a user exists in the target detection sound area and the user does not have lip motion;

generating a second control signal when the user information corresponding to the target detection sound area is used for indicating that a user exists in the target detection sound area and the user has lip motion, the second control signal belonging to the control signal, and the second control signal being used for performing retention on the speech input signal; and generating the first control signal or the second control signal according to an original audio signal when the user information corresponding to the target detection sound area is used for indicating that a user exists in the target detection sound area and a lip motion situation of the user is unknown.

A manner of generating a control signal adopting the CV technology is described in this embodiment. When the CV technology is adopted, a user identity may be recognized, and lip motion information of the user is obtained. In this case, whether a user exists in a current sound area may be estimated only by using the CV technology, or whether a user exists in a current sound area is determined by using the CV technology in a spatial spectrum estimation manner, so that sound area information of N sound areas is obtained, where the sound area information of the N sound areas may be represented as $\{(i, \theta_i, \lambda_i, L_i)\}_{i=1, \ldots, N}$.

For ease of description, any sound area in N sound areas is used as an example to describe this application, and a control signal in another sound area may be generated in a similar manner, which is not described herein. Any sound area may be used as a target detection sound area, assuming that the sound area is an $i^{th}$ sound area, and sound area information of the i is $\{(i, \theta_i, \lambda_i, L_i)\}$, where user information $\lambda_i$ may be a first identity, a second identity, or a third identity, and lip motion information may be a first motion identifier, a second motion identifier, or a third motion identifier. Specifically, during the generation of the control signal, if it is detected that no user exists in the $i^{th}$ sound area, all signals at the sound pointing angle $\theta_i$ may be learned and suppressed through a signal separator, that is, a first control signal is generated through the signal separator, and all the signals at the sound pointing angle $\theta_i$ are suppressed by using the first control signal. If it is detected that a user exists in the $i^{th}$ sound area, whether the user has lip motion needs to be further determined.

If it is detected that a user exists in the $i^{th}$ sound area, but the user does not have lip motion, all signals at the sound pointing angle $\theta_i$ may be learned and suppressed through a signal separator, that is, a first control signal is generated through the signal separator, and all the signals at the sound pointing angle $\theta_i$ are suppressed by using the first control signal.

If it is detected that a user exists in the $i^{th}$ sound area and the user has lip motion, signals at the sound pointing angle $\theta_i$ may be learned and retained through the signal separator, that is, a second control signal is generated through the signal separator, and the signals at the sound pointing angle $\theta_i$ are retained by using the second control signal.

If it is detected that a user exists in the $i^{th}$ sound area and the user has lip motion, signals at the sound pointing angle $\theta_i$ may be learned and retained through the signal separator, that is, a second control signal is generated through the signal separator, and the signals at the sound pointing angle $\theta_i$ are retained by using the second control signal.

If it is detected that a user exists in the $i^{th}$ sound area, the lip cannot be clearly captured by the camera due to an unclear face or a relatively large face deflection angle, resulting in that a lip motion situation of the user cannot be determined due to. In view of this, spatial spectrum estimation or azimuth estimation needs to be performed on an original audio signal inputted at the sound pointing angle $\theta_i$, to roughly determine whether the user is speaking. If it is determined that the user is speaking, signals at the sound pointing angle $\theta_i$ may be learned and retained through the signal separator, that is, a second control signal is generated through the signal separator, and the signals at the sound pointing angle $\theta_i$ are retained by using the second control signal. If it is determined that the user does not speak, all signals at the sound pointing angle $\theta_i$ may be learned and suppressed through a signal separator, that is, a first control signal is generated through the signal separator, and all the signals at the sound pointing angle $\theta_i$ are suppressed by using the first control signal.

In addition, in this embodiment of this application, the manner of generating a control signal adopting the CV technology is provided. In the foregoing manner, the control signal is generated according to both audio data and image data. In this way, on the one hand, the flexibility of the technical solution is improved; and on the other hand, a control signal generated based on more information may be more accurate, thereby improving the accuracy of speech detection.

Based on the embodiment corresponding to FIG. 3, in another exemplary embodiment provided in the embodiments of this application, the generating a control signal corresponding to the target detection sound area according to sound area information corresponding to the target detection sound area specifically includes the following steps:

generating the control signal corresponding to the target detection sound area according to sound area information corresponding to the target detection sound area by using a preset algorithm, the preset algorithm being an adaptive beamforming algorithm, a blind source separation algorithm, or a deep learning-based speech separation algorithm; and the processing a speech input signal corresponding to the target detection sound area by using the control signal corresponding to the target detection sound area, to obtain a speech output signal corresponding to the target detection sound area specifically includes the following steps:

processing, when the preset algorithm is the adaptive beamforming algorithm, a speech input signal corresponding to the target detection sound area according to the control signal corresponding to the target detection sound area by using the adaptive beamforming algorithm, to obtain the speech output signal corresponding to the target detection sound area;

processing, when the preset algorithm is the blind source separation algorithm, the speech input signal corresponding to the target detection sound area according to the control signal corresponding to the target detection sound area by using the blind source separation algorithm, to obtain the speech output signal corresponding to the target detection sound area; and processing, when the preset algorithm is the deep learning-based speech separation algorithm, the speech input signal corresponding to the target detection sound area according to the control signal corresponding to the target detection sound area by using the deep learning-based speech separation algorithm, to obtain the speech output signal corresponding to the target detection sound area.

A manner of signal separation based on the control signal is described in this embodiment. The preset algorithm adopted during the generation of the control signal is consistent with an algorithm adopted during signal separation in actual application. This application provides three preset algorithms, namely, an adaptive beamforming algorithm, a blind source separation algorithm, or a deep learning-based speech separation algorithm. The signal separation is described below with reference to the three preset algorithms.

1. The Adaptive Beamforming Algorithm

Adaptive beamforming is also referred to as adaptive spatial filtering, spatial filtering processing may be performed by weighting each array element, to enhance useful signals and suppress interference. In addition, a weighting factor of each array element may be changed according to change of a signal environment. Under an ideal condition, the adaptive beamforming technology may effectively suppress interference and retain desired signals, thereby maximizing an interference-to-noise ratio of an output signal of an array.

2. The Blind Source Separation Algorithm

Blind source separation (BSS) means that the source signal is estimated only according to an observed mixed signal when a source signal and a signal mixed parameter are unknown. Independent component analysis (ICA) is a new technology gradually developed to resolve the problem of blind signal separation. The method of independent component analysis is mainly used to resolve the blind signal separation, that is, a received mixed signal is decomposed into several independent components according to the principle of statistical independence by using an optimization algorithm, and such independent components are used as an approximate estimation of the source signal.

3. The Deep Learning-Based Speech Separation Algorithm

Speech separation based on deep learning mainly adopts the method based on deep learning to learn features of voice, a speaker, and noise, thereby achieving an objective of speech separation. To be specific, a multi-layer perception, a deep neural network (DNN), a convolutional neural network (CNN), a long short-term memory (LSTM) network, a generative adversarial network (GAN), or the like may be used. This is not limited herein.

A generator is usually set to convolution layers in a model when speech enhancement is performed by using the GAN, to reduce training parameters, thereby shortening the training time. A discriminator is responsible for providing authenticity information of generated data to the generator, and helping the generator to slightly adjust to "generating a clean sound".

In addition, in this embodiment of this application, the manner of signal separation based on the control signal is provided. In the foregoing manner, the adaptive beamforming algorithm is also used during the signal separation when the control signal is generated by using the adaptive beamforming algorithm, the blind source separation algorithm is also used during the signal separation when the control signal is generated by using the blind source separation algorithm, and the deep learning-based speech separation algorithm is also used during the signal separation when the control signal is generated by using the deep learning-based speech separation algorithm. In this way, the control signal can better coordinate separation of signals, to achieve a better signal separation effect, thereby improving the accuracy of speech detection.

Based on the embodiment corresponding to FIG. 3, in another exemplary embodiment provided in the embodiments of this application, the generating a speech detection result of the target detection sound area according to the speech output signal corresponding to the target detection sound area specifically includes the following steps:

determining a signal power corresponding to the target detection sound area according to the speech output signal corresponding to the target detection sound area, the signal power is a signal power of the speech output signal at a time-frequency point;

determining an estimated signal-to-noise ratio corresponding to the target detection sound area according to the signal power corresponding to the target detection sound area;

determining an output signal weighted value corresponding to the target detection sound area according to the estimated signal-to-noise ratio corresponding to the target detection sound area, the output signal weighted value being a weighted result of the speech output signal at the time-frequency point;

determining a target speech output signal corresponding to the target detection sound area according to the output signal weighted value corresponding to the target detection sound area and the speech output signal corresponding to the target detection sound area; and determining the speech detection result corresponding to the target detection sound area according to the target speech output signal corresponding to the target detection sound area.

A manner of performing cross-channel post-processing on a speech output signal is described in this embodiment. Since a speech output signal after signal separation is not always clean, cross-channel post-processing may be performed when a speech output signal corresponding to each sound pointing angle has a relatively high signal-to-noise ratio. The signal-to-noise ratio is considered to be relatively high when the considered to be high of the speech output signal is higher than −5 decibels. However, a critical value of the signal-to-noise ratio may further be adjusted according to an actual situation, and "−5 decibels" is merely an example and is not be construed as a limitation on this application.

Each sound area is used as a target detection sound area, and an implementation of cross-channel post-processing includes: firstly, determining a signal power corresponding to the target detection sound area according to the speech output signal corresponding to the target detection sound area; then, calculating an estimated signal-to-noise ratio corresponding to the target detection sound area, and determining an output signal weighted value corresponding to the target detection sound area; and finally, determining a target speech output signal corresponding to the target detection sound area according to the output signal weighted value and the speech output signal corresponding to the target detection sound area, and determining a speech detection result corresponding to the target detection sound area based on the target speech output signal. Based on this, for ease of description, any sound area in N sound areas is used as an example to made a description below, and a target speech output signal in another sound area is also determined in a similar manner, which is not described herein. Any sound area may be used as a target detection sound area, assuming that the sound area is an $i^{th}$ sound area, a corresponding sound pointing angle is $\theta_i$, and for each time-frequency point (t, f) of the sound pointing angle $\theta_i$, an estimated signal-to-noise ratio of the $i^{th}$ sound area may be calculated by using the following formula:

$$\mu_i(t, f) = \frac{P_i(t, f)}{\max\limits_{j=1, \ldots, N \& j \neq i} P_j(t, f)};$$

where $\mu_i$(t, f) represents an estimated signal-to-noise ratio of the $i^{th}$ sound area, (t, f) represents a signal power of a speech output signal in a direction with the sound pointing angle $\theta_i$ at the time-frequency point (t, f), N represents N sound areas (which can also be used as N sound pointing angles), j represents a $j^{th}$ sound area (which can also be used as a $j^{th}$ sound pointing angle), i represents an $i^{th}$ sound area (which can also be used as an $i^{th}$ sound pointing angle), t represents a time, and f represents a frequency.

Next, an output signal weighted value of the $i^{th}$ sound area is calculated below by using a formula of Wiener filtering:

$$g_i(t, f) = \sqrt{\frac{\mu_i(t, f)}{\mu_i(t, f) + 1}};$$

where $g_i$(t' f) represents an output signal weighted value of the $i^{th}$ sound area, that is, a weight of the speech output signal in the direction with the sound pointing angle $\theta_i$ at the time-frequency point (t, f).

Finally, based on the output signal weighted value of the $i^{th}$ sound area and the speech output signal of the $i^{th}$ sound area, a target speech output signal of the $i^{th}$ sound area may be calculated by using the following formula:

$$y_i(t,f)=x_i(t,f)*g_i(t,f); \text{where}$$

$y_i$(t, f) represents a target speech output signal of the $i^{th}$ sound area, that is, a target speech output signal calculated in the sound pointing angle $\theta_i$ by using a cross-channel post-processing algorithm. $x_i$(t, f) represents a speech output signal of the $i^{th}$ sound area, that is, a speech output signal in the direction with the sound pointing angle $\theta_i$. It may be understood that, the target speech output signal $y_i$(t, f) in this embodiment is a speech output signal having not been noise-reduced.

In addition, in this embodiment of this application, the manner of performing cross-channel post-processing on a speech output signal is provided. In the foregoing manner, considering a correlation between different sound areas, speech signals may be better separated by performing cross-channel post-processing, and especially when the signal-to-noise ratio is high enough, the purity of the speech signal may be improved, thereby further improving the quality of the output signal.

Based on the embodiment corresponding to FIG. 3, in another exemplary embodiment provided in the embodiments of this application, the determining a target speech output signal corresponding to the target detection sound area according to the output signal weighted value corresponding to the target detection sound area and the speech output signal corresponding to the target detection sound area specifically includes the following steps:

determining a to-be-processed speech output signal corresponding to the target detection sound area according to the output signal weighted value corresponding to the target detection sound area and the speech output signal corresponding to the target detection sound area; and performing noise reduction on the to-be-processed speech output signal corresponding to the target detection sound area, to obtain the target speech output signal corresponding to the target detection sound area.

A manner of performing noise reduction on a to-be-processed speech output signal is described in this embodiment. For ease of description, any sound area in N sound areas is used as an example to made a description below, and a target speech output signal in another sound area is also determined in a similar manner, which is not described herein. Any sound area may be used as a target detection sound area, assuming that the sound area is an $i^{th}$ sound area, a corresponding sound pointing angle is $\theta_i$. As can be seen from the foregoing embodiments that, the target speech output signal of the $i^{th}$ sound area may be calculated according to the output signal weighted value of the $i^{th}$ sound area and the speech output signal of the $i^{th}$ sound area. However, when noise reduction is required, based on the output signal weighted value of the $i^{th}$ sound area and the speech output signal of the $i^{th}$ sound area, a to-be-processed speech output signal of the $i^{th}$ sound area may be calculated by using a specific formula below:

$$y'_i(t,f) = x_i(t,f) * g_i(t,f); \text{ where}$$

$y'_i(t, f)$ represents a to-be-processed speech output signal of the $i^{th}$ sound area, that is, a to-be-processed speech output signal calculated in the sound pointing angle $\theta_i$ by using a cross-channel post-processing algorithm. $x_i(t, f)$ represents a speech output signal of the $i^{th}$ sound area, that is, a speech output signal in the direction with the sound pointing angle $\theta_i$. It may be understood that, different from the foregoing embodiments, the to-be-processed speech output signal $y'_i(t, f)$ in this embodiment is a speech output signal having not been noise-reduced, but the target speech output signal $y_i(t, f)$ in this embodiment is a speech output signal after noise reduction.

In view of this, noise reduction is performed on the to-be-processed speech output signal $y'_i(t, f)$, to obtain a target speech output signal $y_i(t, f)$ corresponding to each sound area.

A feasible filtering manner is that, noise reduction is performed by using a least mean square (LMS) adaptive filter, and the LMS adaptive filter automatically adjusts a current filter parameter by using a filter parameter obtained at a previous moment, to adapt to unknown or randomly changed statistical characteristics of the signal and noise, thereby achieving optimal filtering. Another feasible filtering manner is that, noise reduction is performed by using an LMS adaptive notch filter, and the adaptive notch filter is adapted to monochromatic interference noise, for example, single frequency sine wave noise, and it is expected that notch filter has ideal characteristics, and the shoulder of the notch is arbitrarily narrow, which can immediately enter a flat region. Another feasible filtering manner is that, noise reduction is performed by using a basic spectral subtraction algorithm, since the to-be-processed speech output signal is not sensitive to a phase, phase information before spectral subtraction is used in a signal after spectral subtraction, and after an amplitude after spectral subtraction is calculated, a target speech output signal after spectral subtraction can be calculated by performing inverse fast Fourier transform (IFFT) with reference to a phase angle. Another feasible filtering manner is that noise reduction is performed through Wiener filtering. The foregoing examples are merely feasible solutions, and another noise reduction manner may also be adopted in actual application. This is not limited herein.

In addition, in this embodiment of this application, the manner of performing noise reduction on a to-be-processed speech output signal is described. In the foregoing manner, noise, interference human voice, and residual echo can be further suppressed, thereby better improving the quality of the target speech output signal and increasing the accuracy of speech detection.

Based on the embodiment corresponding to FIG. 3, in another exemplary embodiment provided in the embodiments of this application, the generating a speech detection result of the target detection sound area according to the speech output signal corresponding to the target detection sound area specifically includes the following steps:

generating a first speech detection result when the target speech output signal corresponding to the target detection sound area meets a human voice matching condition, the first speech detection result belonging to the speech detection result, and the first speech detection result indicating that the target speech output signal is a human voice signal; and generating a second speech detection result when the target speech output signal corresponding to the target detection sound area does not meet the human voice matching condition, the second speech detection result belonging to the speech detection result, and the second speech detection result indicating that the target speech output signal is a noise signal.

A manner of performing speech detection on each sound area is described in this embodiment. During the speech detection, whether a speech output signal corresponding to each sound area meets a human voice matching condition needs to be determined. The "target speech output signal" in this embodiment is obtained by performing cross-channel post-processing and noise reduction post-processing on the speech output signal. Speech detection is performed on the "speech output signal" when the speech output signal has not been subjected to cross-channel post-processing and noise reduction post-processing. Speech detection may be performed on the "to-be-processed speech output signal" when the speech output signal has only been subject to cross-channel post-processing without being subject to noise reduction post-processing. The "target speech output signal" is used as an example to describe this application, which shall not be construed as a limitation on this application.

How to determine whether the human voice matching condition is met based on the target speech output signal is described below. For ease of description, any sound area in N sound areas is used as an example to made a description below, and a speech detection result in another sound area is also determined in a similar manner, which is not described herein. Any sound area may be used as a target detection sound area. During the detection, whether a sound area meets the human voice matching condition may be determined according to any one of the target speech output signal, the lip motion information, the user information, or the voiceprint, and the description is made below with reference to several examples.

First case: when the target speech output signal is not received, that is, the user does not speak, it is determined that the human voice matching condition is not met.

Second case: when the received target speech output signal is very weak or not like human voice, it can be determined that the user does not speak in a sound pointing angle direction corresponding a sound area in this case, and the human voice matching condition is not met.

Third case: when the received target speech output signal is human voice that is extremely mismatched (for example, a matching score is less than 0.5) with voiceprint of given user information, it may be determined that, the user does not speak in a sound pointing angle direction corresponding a sound area in this case, the target speech output signal is a noise signal leaked from human voice in other directions to a local sound channel, and the human voice matching condition is not met.

Fourth case: when the received target speech output signal is human voice, but the lip motion information indicates that the user does not have lip motion and a degree of voiceprint matching is not high, it may be also determined that the user does not speak in a sound pointing angle direction corresponding a sound area in this case, the target speech output signal is a noise signal leaked from human voice in other directions to a local sound channel, and the human voice matching condition is not met.

Corresponding voiceprint may be obtained from a database based on the user information (assuming that the user has registered with the user information), whether a target speech output signal in a current channel matches voiceprint of the user may be determined according to the voiceprint. When the matching succeeds, it is determined that the human voice matching condition is met; and when the matching fails, it may be determined that the target speech output signal is a noise signal leaked from human voice in other directions to a local sound channel, that is, the human voice matching condition is not met.

The foregoing four cases are merely examples, and in actual application, another determining manner may also be flexibly set according to situations. This is not limited herein. If it is determined that the target speech output signal meets the human voice matching condition, a first speech detection result is generated, that is, indicating that the target speech output signal is a normal human voice signal; and on the contrary, if it is determined that the target speech output signal does not meet the human voice matching condition, a second speech detection result is generated, that is, indicating that the target speech output signal is a noise signal.

In addition, in this embodiment of this application, the manner of performing speech detection on each sound area is provided. In the foregoing manner, whether the human voice matching condition is met needs to be determined for each sound area, and it is considered that the human voice matching condition is not met when even if a user exists in some sound areas, the user does not speak or speaks in a very low voice, or identity information of the user does not match preset identity information. Therefore, improve the accuracy of speech detection, whether the speech output signal corresponding to the sound area meets the human voice matching condition may be determined from a plurality of dimensions, thereby improving the feasibility and operability of the solution.

Based on the embodiment corresponding to FIG. 3, in another exemplary embodiment provided in the embodiments of this application, after the generating a speech detection result of the target detection sound area according to the speech output signal corresponding to the target detection sound area, the method may further include the following steps:

determining a target sound area from the M sound areas according to a speech output signal corresponding to each sound area in the M sound areas when speech detection results corresponding to M sound areas are first speech detection results, the first speech detection result indicating that the speech output signal is the human voice signal, the M sound areas belonging to the N sound areas, M being an integer greater than or equal to 1 and less than or equal to N; and transmitting a speech output signal corresponding to the target sound area to a calling party.

A manner of calling based on a speech detection result is described in this embodiment. As can be seen from the foregoing embodiments that, a sound area corresponding to the first speech detection result is selected after a speech detection result corresponding to each sound area in N sound areas is obtained. This is because in a call scenario, it is necessary to transmit human voice and suppress noise to improve the call quality, where the first speech detection result indicates that the speech output signal of the sound area is a human voice signal. It is to be understood that the "speech output signal" in this embodiment may also be the "to-be-processed speech output signal" or the "target speech output signal", which can be flexibly selected in a specific processing process. The description herein is merely an example, and shall not be construed as a limitation on this application.

Figure 6:
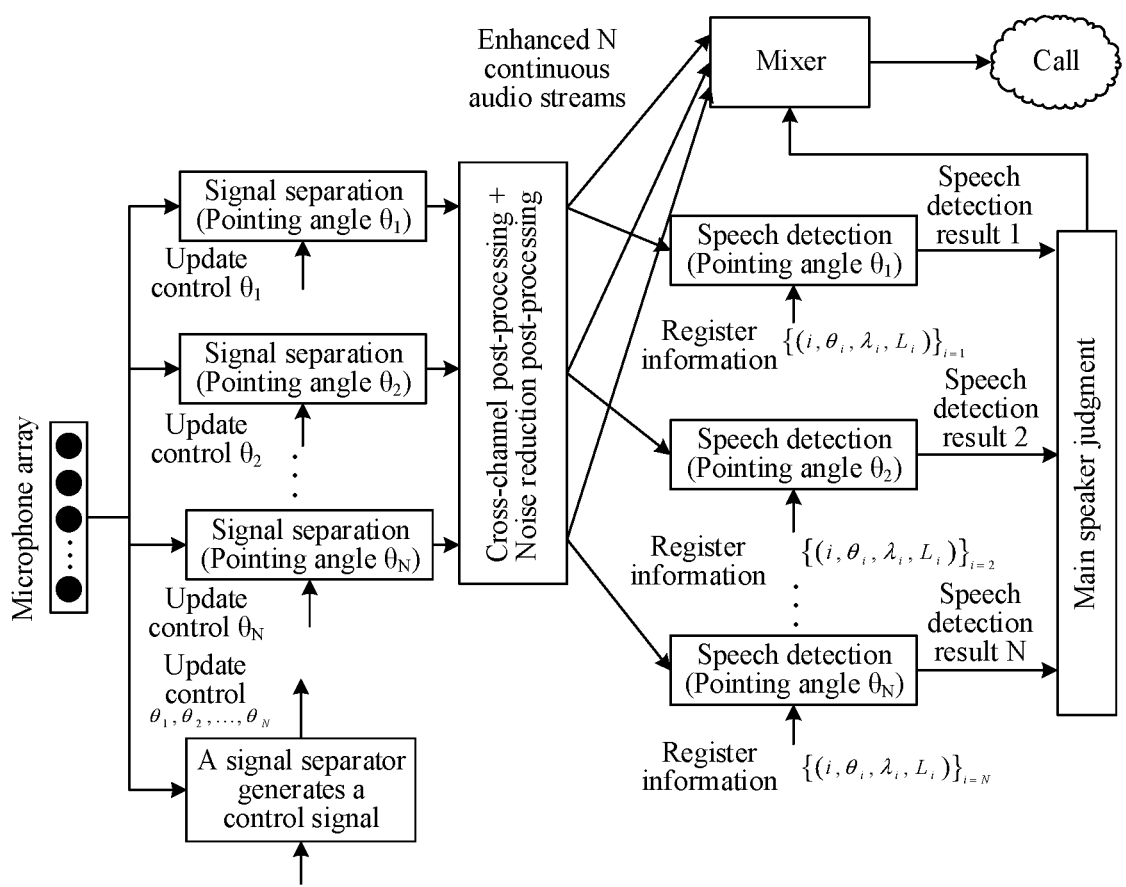
FIG. 6 is another schematic architectural diagram of a multi-channel sound pickup system according to an embodiment of this application.

Assuming that speech detection results of M sound areas in N sound areas are first speech detection results, that is, a speech output signal (or a target speech output signal or a to-be-processed speech output signal) corresponding to each sound area in the M sound areas. Based on this, a main speaker may further be judged based on speech output signals of the M sound areas, where each sound area in the M sound areas is referred to as a "target sound area". For ease of description, referring to FIG. 6, FIG. 6 is another schematic architectural diagram of a multi-channel sound pickup system according to an embodiment of this application. As shown in the figure, the microphone array equipped on the terminal device may pick up an audio signal corresponding to each sound area, where the audio signal includes a speech input signal and a noise signal. A control signal corresponding to each sound area is generated by a signal separator, and suppression or retention is performed on a speech input signal of each sound pointing angle by using the control signal corresponding to the sound area, to obtain a speech output signal corresponding to the sound area. A speech detection result of the sound area is determined based on sound area information and the target speech output signal of the sound area.

A main speaker judging module determines a main speaker in real time according to speech output signals and sound area information of M sound areas, for example, when a delay of a judgment result is required to be high, the main speaker judging module may directly measure an original volume of a speaker (a volume at a mouth) according to a signal strength of each speaker received in a short time and the distance (which may be provided by a wide-angle camera or a multi-camera array) between the speaker and the microphone array, so that the main speaker is determined according to the original volume. In another example, when the delay of the judgment result is required to be high, the main speaker may be determined according to a facial orientation of each speaker (for example, in a video conference scenario, a user whose face is facing the camera is more likely to be the main speaker). The judgment result of the main speaker includes an orientation and an identity of the main speaker, and the judgment result is outputted to a mixer for a call demand. The mixer merges N continuous audio streams into one or more channels of output audio according to the judgment result of the main speaker, to meet call requirements. In an implementation, when the main speaker is determined to be in a direction with a sound pointing angle $\theta_i$, outputted single channel audio is equal to a speech output signal inputted in the first channel, and input data of another channel is directly discarded. In an implementation, when the main speaker is determined to be in a direction with a sound pointing angle $\theta_i$ and in a direction with a sound pointing angle $\theta_4$, outputted audio is equal to the speech output signal inputted in the first channel and a speech output signal inputted in the fourth channel, and input data of another channel is directly discarded.

As can be seen from FIG. 6 that, cross-channel post-processing and noise reduction post-processing may further be performed on the speech output signal, to obtain a target speech output signal corresponding to each sound area, and a speech detection result of the sound area is determined based on the sound area information and the target speech output signal of the sound area.

Figure 7:
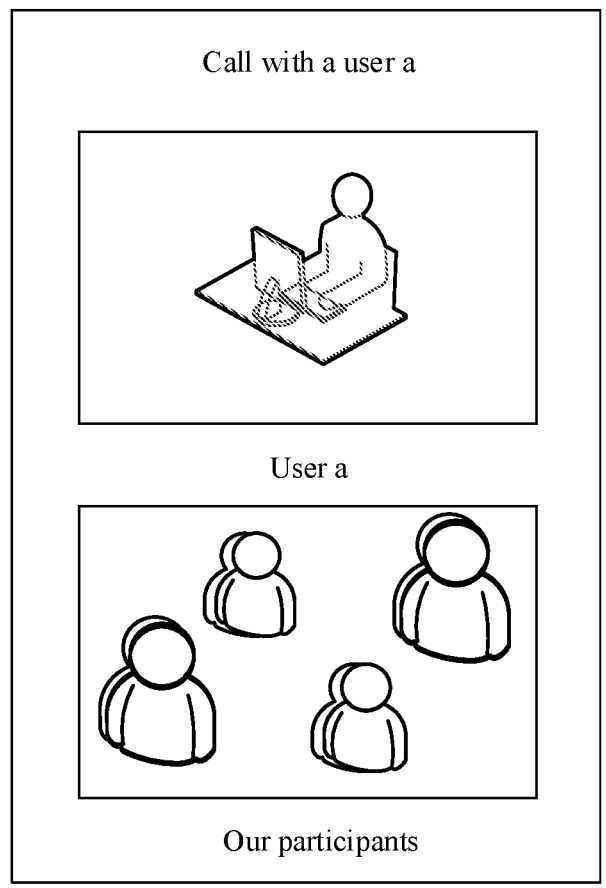
FIG. 7 is a schematic diagram of an interface of implementing calling by using a multi-sound area-based speech detection method according to an embodiment of this application.

Referring to FIG. 7, FIG. 7 is a schematic diagram of an interface of implementing calling by using a multi-sound area-based speech detection method according to an embodiment of this application. As shown in the figure, using an example in which the method is applied to a call scenario, there are a plurality of users in our participants. Therefore, a main speaker may be determined by using the technical solutions provided in this application, voice of the main speaker is transmitted to a user a, while voice of another speaker or noise may be suppressed, so that the user a can hear clearer voice.

In this embodiment of this application, the manner of calling based on a speech detection result is provided. In the foregoing manner, speech of each user can be separated and enhanced in real time in a multi-user scenario, so that high-quality call can be achieved in the call scenario according to the speech detection result and based on processes of multi-user parallel separation enhancement processing and post-mixed processing.

Based on the embodiment corresponding to FIG. 3, in another exemplary embodiment provided in the embodiments of this application, after the generating a speech detection result of the target detection sound area according to the speech output signal corresponding to the target detection sound area, the method may further include the following steps:

determining a target sound area from the M sound areas according to a speech output signal corresponding to each sound area in the M sound areas when speech detection results corresponding to M sound areas are first speech detection results, the first speech detection result indicating that the speech output signal is the human voice signal, the M sound areas belonging to the N sound areas, M being an integer greater than or equal to 1 and less than or equal to N; and performing semantic recognition on a speech output signal corresponding to the target sound area, to obtain a semantic recognition result; and generating dialog response information according to the semantic recognition result.

A manner of feeding back dialog response information based on a speech detection result is provided in this embodiment. As can be seen from the foregoing embodiments that, a sound area corresponding to the first speech detection result is selected after a speech detection result corresponding to each sound area in N sound areas is obtained. This is because in an intelligent dialog scenario, it is necessary to transmit human voice and suppress noise to improve the accuracy of the intelligent dialog, where the first speech detection result indicates that the speech output signal of the sound area is a human voice signal. It is to be understood that the "speech output signal" in this embodiment may also be the "to-be-processed speech output signal" or the "target speech output signal", which can be flexibly selected in a specific processing process. The description herein is merely an example, and shall not be construed as a limitation on this application.

Figure 8:
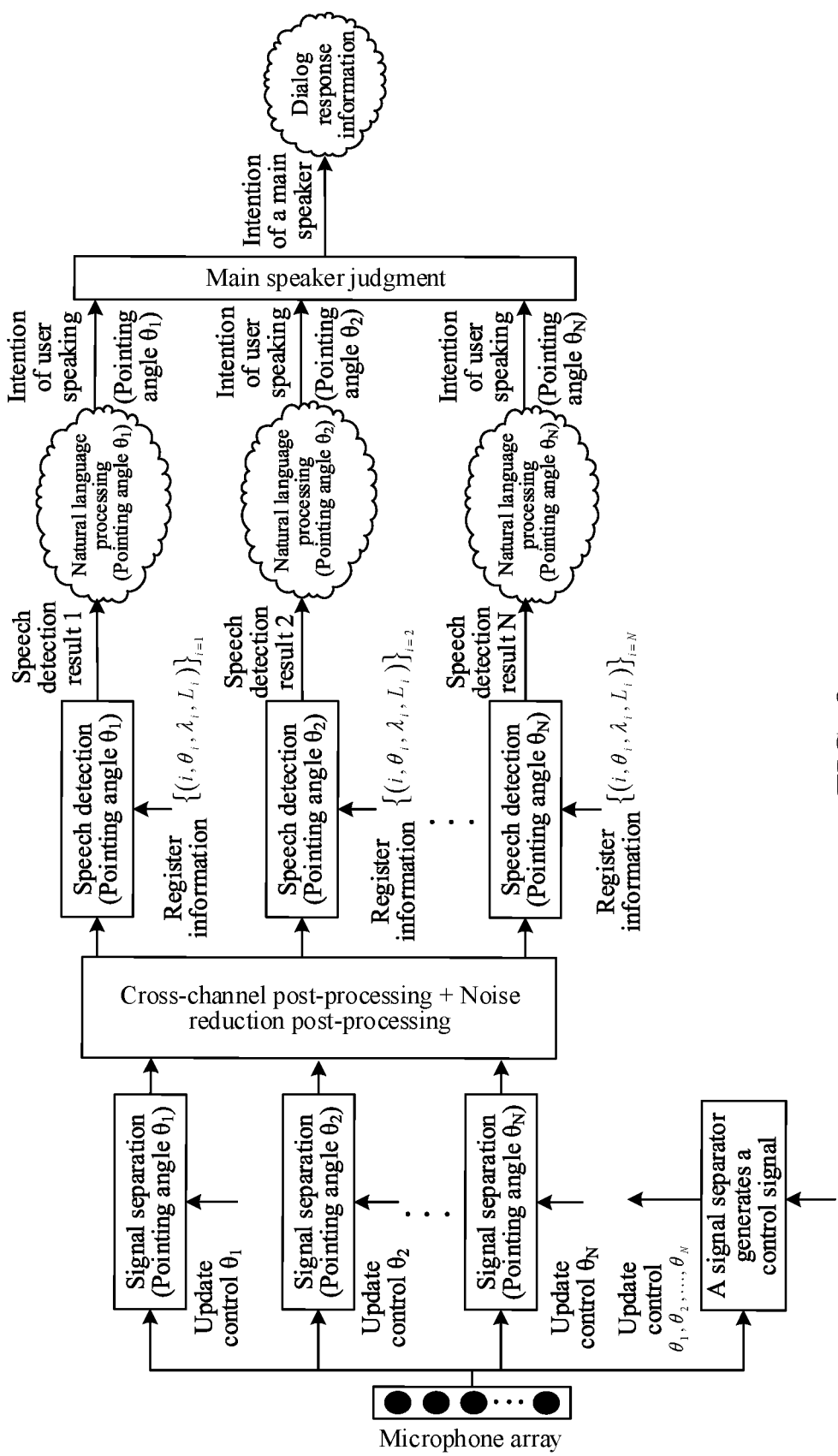
FIG. 8 is another schematic architectural diagram of a multi-channel sound pickup system according to an embodiment of this application.

Assuming that speech detection results of M sound areas in N sound areas are first speech detection results, that is, a speech output signal (or a target speech output signal or a to-be-processed speech output signal) corresponding to each sound area in the M sound areas. Based on this, a main speaker may further be judged based on speech output signals of the M sound areas, where each sound area in the M sound areas is referred to as a "target sound area". For ease of description, referring to FIG. 8, FIG. 8 is another schematic architectural diagram of a multi-channel sound pickup system according to an embodiment of this application. As shown in the figure, the microphone array equipped on the terminal device may pick up an audio signal corresponding to each sound area, where the audio signal includes a speech input signal and a noise signal. A control signal corresponding to each sound area is generated by a signal separator, and suppression or retention is performed on a speech input signal of each sound pointing angle by using the control signal corresponding to the sound area, to obtain a speech output signal corresponding to the sound area. A speech detection result of the sound area is determined based on sound area information and the target speech output signal of the sound area.

Then, nature language processing (NLP) is performed on a speech output signal corresponding to each target sound area in M sound areas, so that an intention of a speaker in the target sound area is obtained, that is, a semantic recognition result is obtained.

A main speaker judging module determines a main speaker in real time according to speech output signals and sound area information of M sound areas, for example, when a delay of a judgment result is required to be high, the main speaker judging module may directly measure an original volume of a speaker (a volume at a mouth) according to a signal strength of each speaker received in a short time and the distance (which may be provided by a wide-angle camera or a multi-camera array) between the speaker and the microphone array, so that the main speaker is determined according to the original volume. In another example, when the delay of the judgment result is required to be high, the main speaker may be determined according to a semantic recognition result and a facial orientation of each speaker (for example, in a video conference scenario, a user whose face is facing the camera is more likely to be the main speaker). The judgment result of the main speaker includes an orientation and an identity of the main speaker, and the judgment result is used as a basis for generating dialog response information, to accordingly reply to dialog response information corresponding to the intention of the main speaker.

As can be seen from FIG. 8 that, cross-channel post-processing and noise reduction post-processing may further be performed on the speech output signal, to obtain a target speech output signal corresponding to each sound area, and a speech detection result of the sound area is determined based on the sound area information and the target speech output signal of the sound area.

Figure 9:
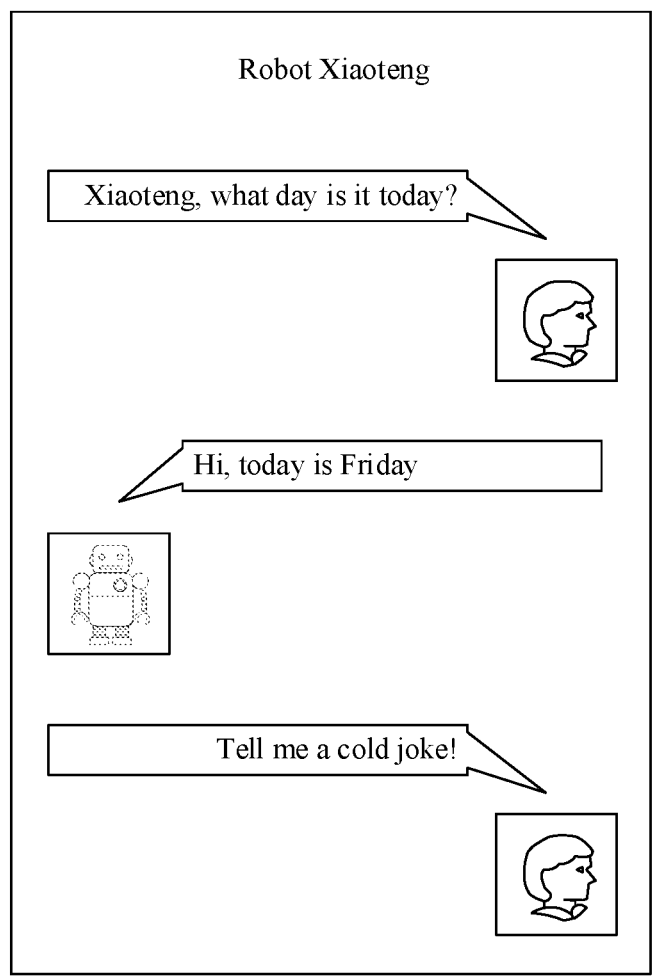
FIG. 9 is a schematic diagram of an interface of implementing dialog responding implemented by using a multi-sound area-based speech detection method according to an embodiment of this application.

Referring to FIG. 9, FIG. 9 is a schematic diagram of an interface of implementing dialog responding implemented by using a multi-sound area-based speech detection method according to an embodiment of this application. As shown in the figure, using an example in which the method is applied to an intelligent dialog, assuming that there are a plurality of speakers in our party, a main speaker may be determined by using the technical solutions provided in this application, and according to the judgment result and the semantic recognition result of the main speaker, a reply is made to "Xiaoteng, what day is it today?" said by the main speaker, that is, dialog response information is generated, for example, "Hi, today is Friday".

In actual application, the method may further be applied to a scenario such as intelligent customer service, human-machine dialog, and the like, so that synchronous, real-time, and independent semantic analysis may be performed on each speaker, functions such as manually blocking or enabling may be performed on the speaker, and functions such as automatically blocking or enabling may be performed on the speaker.

In this embodiment of this application, the manner of feeding back dialog response information based on a speech detection result is provided. In the foregoing manner, speech of each user can be separated and enhanced in real time in a multi-user scenario, to determine a main speaker according to the speech detection result and the semantic recognition result in the intelligent dialog scenario, and improve the speech quality based on processes of multi-user parallel separation enhancement processing and post-mixed processing, so that dialog response information can be separately fed back according to the semantic recognition result, and non-interactive speech may be filtered.

Based on the embodiment corresponding to FIG. 3, in another exemplary embodiment provided in the embodiments of this application, after the generating a speech detection result of the target detection sound area according to the speech output signal corresponding to the target detection sound area, the method may further include the following steps:

determining a target sound area from the M sound areas according to a speech output signal corresponding to each sound area in the M sound areas when speech detection results corresponding to M sound areas are first speech detection results, the first speech detection result indicating that the speech output signal is the human voice signal, the M sound areas belonging to the N sound areas, M being an integer greater than or equal to 1 and less than or equal to N; and performing segmentation processing on a speech output signal corresponding to the target sound area, to obtain to-be-recognized audio data;

performing speech recognition on to-be-recognized audio data corresponding to the target sound area, to obtain a speech recognition result; and generating text record information according to a speech recognition result corresponding to the target sound area, the text record information including at least one of translation text or conference record text.

A manner of generating text record information based on a speech detection result is provided in this embodiment. As can be seen from the foregoing embodiments that, a sound area corresponding to the first speech detection result is selected after a speech detection result corresponding to each sound area in N sound areas is obtained. This is because in a translation or record scenario, it is necessary to transmit human voice and suppress noise to improve the accuracy of translation or record, where the first speech detection result indicates that the speech output signal of the sound area is a human voice signal. It is to be understood that the "speech output signal" in this embodiment may also be the "to-be-processed speech output signal" or the "target speech output signal", which can be flexibly selected in a specific processing process. The description herein is merely an example, and shall not be construed as a limitation on this application.

Figure 10:
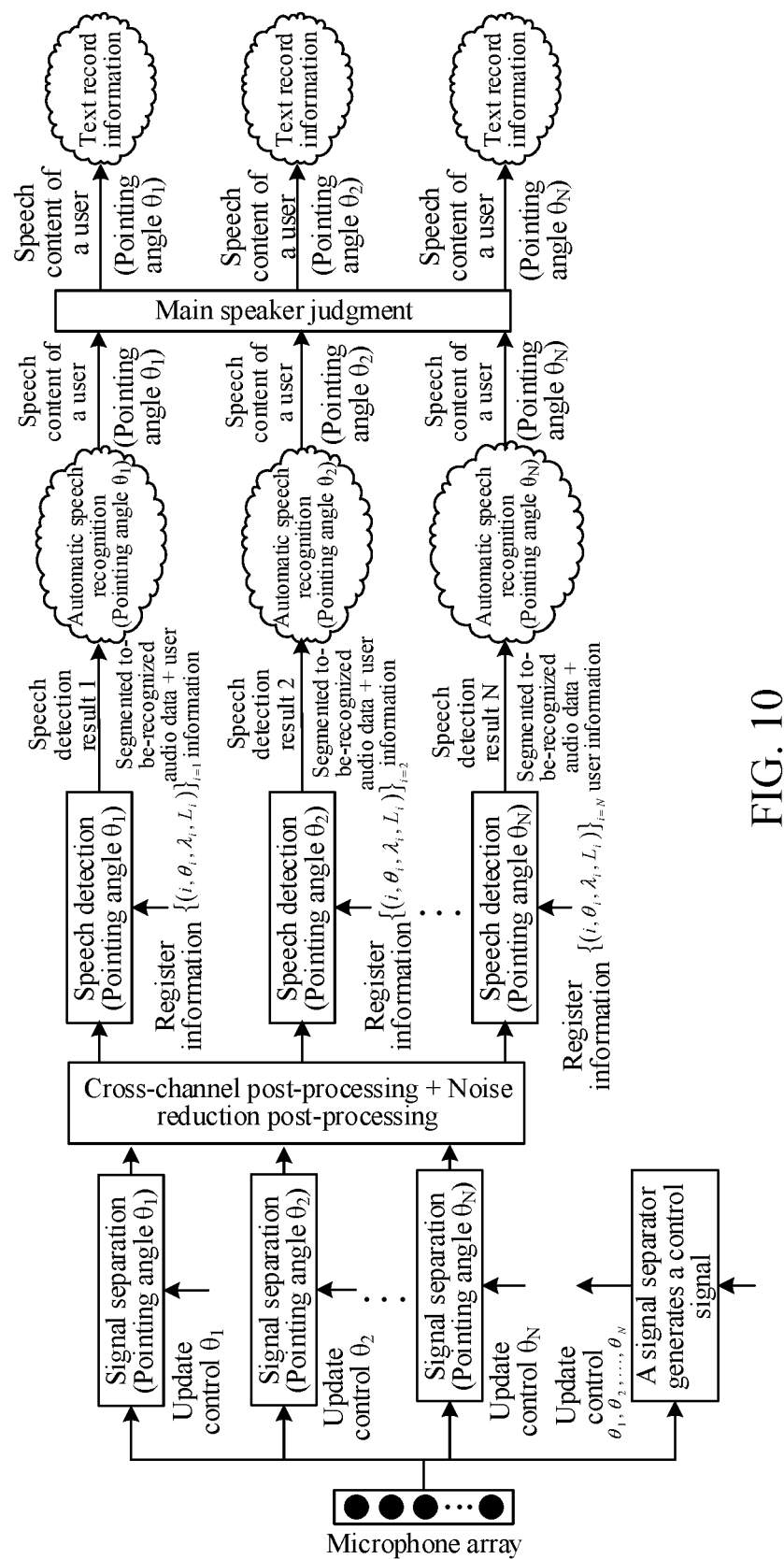
FIG. 10 is another schematic architectural diagram of a multi-channel sound pickup system according to an embodiment of this application.

Assuming that speech detection results of M sound areas in N sound areas are first speech detection results, that is, a speech output signal (or a target speech output signal or a to-be-processed speech output signal) corresponding to each sound area in the M sound areas. Based on this, a main speaker may further be judged based on speech output signals of the M sound areas, where each sound area in the M sound areas is referred to as a "target sound area". For ease of description, referring to FIG. 10, FIG. 10 is another schematic architectural diagram of a multi-channel sound pickup system according to an embodiment of this application. As shown in the figure, the microphone array equipped on the terminal device may pick up an audio signal corresponding to each sound area, where the audio signal includes a speech input signal and a noise signal. A control signal corresponding to each sound area is generated by a signal separator, and suppression or retention is performed on a speech input signal of each sound pointing angle by using the control signal corresponding to the sound area, to obtain a speech output signal corresponding to the sound area. A speech detection result of the sound area is determined based on sound area information and the target speech output signal of the sound area.

Then, a speech output signal corresponding to each target sound area in M sound areas is segmented, that is, a stop position of each speech output signal is determined, to obtain to-be-recognized audio data. In addition, each piece of to-be-recognized audio data carries user information, where the user information may be a user identifier. The to-be-recognized audio data and the user information are both used for subsequent speech recognition tasks. Then, to-be-recognized audio data corresponding to the target sound area in the M sound areas is processed by using the ASR technology, so that speech content of a speaker in the target sound area is obtained, that is, a speech recognition result is obtained.

A main speaker judging module determines a main speaker in real time according to speech output signals and sound area information of M sound areas, for example, when a delay of a judgment result is required to be high, the main speaker judging module may directly measure an original volume of a speaker (a volume at a mouth) according to a signal strength of each speaker received in a short time and the distance (which may be provided by a wide-angle camera or a multi-camera array) between the speaker and the microphone array, so that the main speaker is determined according to the original volume. In another example, when the delay of the judgment result is required to be high, the main speaker may be determined according to a speech recognition result and a facial orientation of each speaker (for example, in a video conference scenario, a user whose face is facing the camera is more likely to be the main speaker). The judgment result of the main speaker includes an orientation and an identity of the main speaker, and the judgment result is used as a basis for generating text record information, to accordingly display dialog response information, where the text record information includes at least one of translation text or conference record text.

It may be understood that, by using the ASR technology, the segmented to-be-recognized audio data may be transmitted together with voiceprint to an ASR module in a cloud in a regular manner or in a form of a machine learning model. Generally, a voiceprint identifier or a voiceprint model parameter is sent to the ASR module in the cloud, so that the ASR module may further improve a recognition rate of the module by using voiceprint information.

As can be seen from FIG. 10 that, cross-channel post-processing and noise reduction post-processing may further be performed on the speech output signal, to obtain a target speech output signal corresponding to each sound area, and a speech detection result of the sound area is determined based on the sound area information and the target speech output signal of the sound area. In addition, an object of a speech signal to be segmented is a target speech output signal corresponding to each target sound area.

Figure 11:
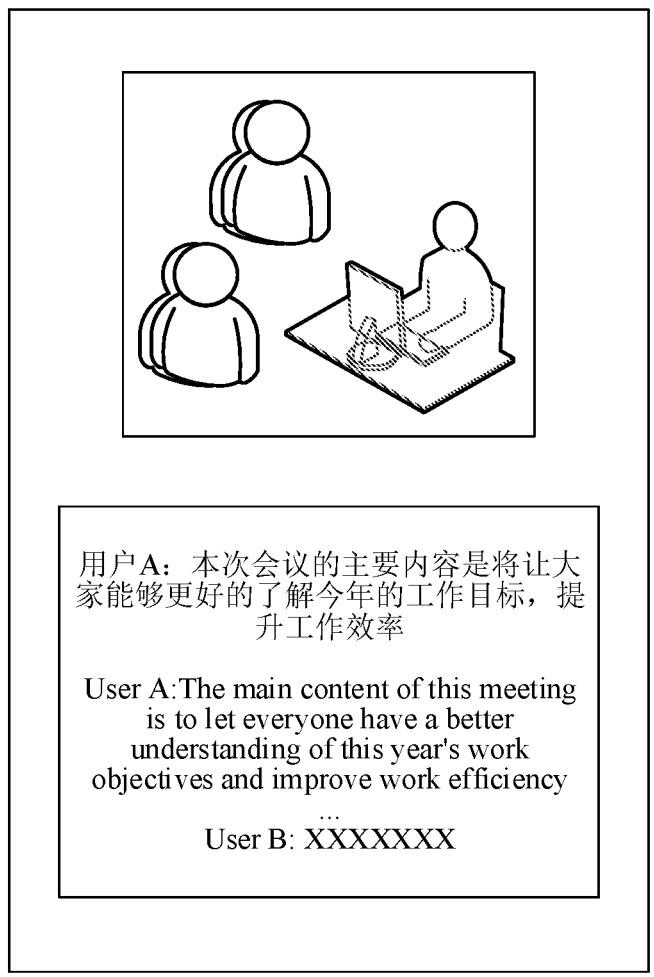
FIG. 11 is a schematic diagram of implementing text recording by using a multi-sound area-based speech detection method according to an embodiment of this application.

Referring to FIG. 11, FIG. 11 is a schematic diagram of implementing text recording by using a multi-sound area-based speech detection method according to an embodiment of this application. As shown in the figure, using an example in which the method is applied to a simultaneous interpretation scenario, assuming that there are a plurality of speakers in our party, a main speaker may be determined by using the technical solutions provided in this application, and a paragraph said by the main speaker may be interpreted in real time according to a judgment result and a speech recognition result of the main speaker. For example, the main speaker is a user A, and the user A says that 本次会议的主要内容是将让大 家能够更好的了解今年的工作目标, 提升工作效率. In this case, the text record information may be displayed in real time, for example, "The main content of this meeting is to let everyone have a better understanding of this year's work objectives and improve work efficiency".

In actual application, the method may further be applied to a scenario such as translation, conference record, conference assistant, and the like, so that synchronous, real-time, and independent speech recognition (for example, complete conference transcription) may be performed on each speaker, functions such as manually blocking or enabling may be performed on the speaker, and functions such as automatically blocking or enabling may be performed on the speaker.

In this embodiment of this application, the manner of generating text record information based on a speech detection result is provided. In the foregoing manner, speech of each user can be separated and enhanced in real time in a multi-user scenario, so that starting and ending time points of each speaker may be accurately distinguished according to the speech detection result and the speech recognition result in the intelligent dialog scenario; speech of each speaker is separately recognized, to achieve more accurate speech recognition performance for subsequent semantic understanding performance and translation performance; and the speech quality is improved based on processes of multi-user parallel separation enhancement processing and post-mixed processing, thereby improving the accuracy of the text record information.

Figure 12:
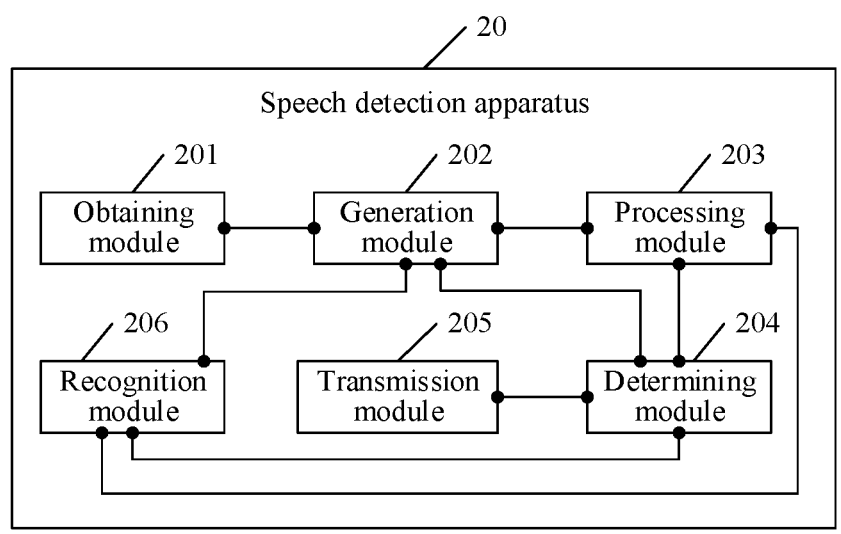
FIG. 12 is a schematic diagram of an embodiment of a speech detection apparatus according to an embodiment of this application.

The speech detection apparatus provided in this application is described in detail below. Referring to FIG. 12, FIG. 12 is a schematic diagram of an embodiment of a speech detection apparatus according to an embodiment of this application. The speech detection apparatus 20 includes:

an obtaining module 201, configured to obtain sound area information corresponding to each sound area in N sound areas, the sound area information including a sound area identifier, a sound pointing angle, and user information, the sound area identifier being used for identifying a sound area, the sound pointing angle being used for indicating a central angle of the sound area, the user information being used for indicating a user existence situation in the sound area, N being an integer greater than 1;

a generation module 202, configured to use the sound area as a target detection sound area, and generate a control signal corresponding to the target detection sound area according to sound area information corresponding to the target detection sound area, the control signal being used for performing suppression or retention on a speech input signal, the control signal and the sound area being in a one-to-one correspondence; and a processing module 203, configured to process a speech input signal corresponding to the target detection sound area by using the control signal corresponding to the target detection sound area, to obtain a speech output signal corresponding to the target detection sound area, the control signal, the speech input signal, and the speech output signal being in a one-to-one correspondence;

the generation module 202 being further configured to generate a speech detection result of the target detection sound area according to the speech output signal corresponding to the target detection sound area.

Based on the embodiment corresponding to FIG. 12, in another embodiment of the speech detection apparatus 20 provided in this embodiment of this application:

the obtaining module 201 is further configured to: detect the sound area in the N sound areas, to obtain a user detection result corresponding to the sound area;

use the sound area as the target detection sound area, and determine user information corresponding to the target detection sound area according to a user detection result corresponding to the target detection sound area;

determine lip motion information corresponding to the target detection sound area according to the user detection result corresponding to the target detection sound area;

obtain a sound area identifier corresponding to the target detection sound area and a sound pointing angle corresponding to the target detection sound area; and generate the sound area information corresponding to the target detection sound area according to the user information corresponding to the target detection sound area, the lip motion information corresponding to the target detection sound area, the sound area identifier corresponding to the target detection sound area, and the sound pointing angle corresponding to the target detection sound area.

Based on the embodiment corresponding to FIG. 12, in another embodiment of the speech detection apparatus 20 provided in this embodiment of this application:

the obtaining module 201 is further configured to: determine a first identity as the user information when the user detection result corresponding to the target detection sound area is that a recognizable user exists in the target detection sound area;

determine a second identity as the user information when the user detection result corresponding to the target detection sound area is that no user exists in the target detection sound area; and determine a third identity as the user information when the user detection result corresponding to the target detection sound area is that an unknown user exists in the target detection sound area; and the obtaining module 201 is further configured to: determine a first motion identifier as the lip motion information when the user detection result corresponding to the target detection sound area is that a user with lip motion exists in the target detection sound area;

determine a second motion identifier as the lip motion information when the user detection result corresponding to the target detection sound area is that a user exists in the target detection sound area and the user does not have lip motion; and determine a third motion identifier as the lip motion information when the user detection result corresponding to the target detection sound area is that no user exists in the target detection sound area.

Based on the embodiment corresponding to FIG. 12, in another embodiment of the speech detection apparatus 20 provided in this embodiment of this application:

the generation module 202 is further configured to: generate a first control signal when user information corresponding to the target detection sound area is used for indicating that no user exists in the target detection sound area, the first control signal belonging to the control signal, and the first control signal being used for performing suppression on the speech input signal; and generate a second control signal when the user information corresponding to the target detection sound area is used for indicating that a user exists in the target detection sound area, the second control signal belonging to the control signal, and the second control signal being used for performing retention on the speech input signal.

Based on the embodiment corresponding to FIG. 12, in another embodiment of the speech detection apparatus 20 provided in this embodiment of this application:

the generation module 202 is further configured to: generate a first control signal when user information corresponding to the target detection sound area is used for indicating that no user exists in the target detection sound area, the first control signal belonging to the control signal, and the first control signal being used for performing suppression on the speech input signal;

generate the first control signal when the user information corresponding to the target detection sound area is used for indicating that a user exists in the target detection sound area and the user does not have lip motion;

generate a second control signal when the user information corresponding to the target detection sound area is used for indicating that a user exists in the target detection sound area and the user has lip motion, the second control signal belonging to the control signal, and the second control signal being used for performing retention on the speech input signal; and generate the first control signal or the second control signal according to an original audio signal when the user information corresponding to the target detection sound area is used for indicating that a user exists in the target detection sound area and a lip motion situation of the user is unknown.

Based on the embodiment corresponding to FIG. 12, in another embodiment of the speech detection apparatus 20 provided in this embodiment of this application:

the generation module 202 is further configured to: generate the control signal corresponding to the target detection sound area according to sound area information corresponding to the target detection sound area by using a preset algorithm, the preset algorithm being an adaptive beamforming algorithm, a blind source separation algorithm, or a deep learning-based speech separation algorithm; and the processing module 203 is further configured to: process, when the preset algorithm is the adaptive beamforming algorithm, a speech input signal corresponding to the target detection sound area according to the control signal corresponding to the target detection sound area by using the adaptive beamforming algorithm, to obtain the speech output signal corresponding to the target detection sound area;

process, when the preset algorithm is the blind source separation algorithm, the speech input signal corresponding to the target detection sound area according to the control signal corresponding to the target detection sound area by using the blind source separation algorithm, to obtain the speech output signal corresponding to the target detection sound area; and process, when the preset algorithm is the deep learning-based speech separation algorithm, the speech input signal corresponding to the target detection sound area according to the control signal corresponding to the target detection sound area by using the deep learning-based speech separation algorithm, to obtain the speech output signal corresponding to the target detection sound area.

Based on the embodiment corresponding to FIG. 12, in another embodiment of the speech detection apparatus 20 provided in this embodiment of this application:

the generation module 202 is further configured to: determine a signal power corresponding to the target detection sound area according to the speech output signal corresponding to the target detection sound area, the signal power is a signal power of the speech output signal at a time-frequency point;

determine an estimated signal-to-noise ratio corresponding to the target detection sound area according to the signal power corresponding to the target detection sound area;

determine an output signal weighted value corresponding to the target detection sound area according to the estimated signal-to-noise ratio corresponding to the target detection sound area, the output signal weighted value being a weighted result of the speech output signal at the time-frequency point;

determine a target speech output signal corresponding to the target detection sound area according to the output signal weighted value corresponding to the target detection sound area and the speech output signal corresponding to the target detection sound area; and determine the speech detection result corresponding to the target detection sound area according to the target speech output signal corresponding to the target detection sound area.

Based on the embodiment corresponding to FIG. 12, in another embodiment of the speech detection apparatus 20 provided in this embodiment of this application:

the generation module 202 is further configured to: determine a to-be-processed speech output signal corresponding to the target detection sound area according to the output signal weighted value corresponding to the target detection sound area and the speech output signal corresponding to the target detection sound area; and perform noise reduction on the to-be-processed speech output signal corresponding to the target detection sound area, to obtain the target speech output signal corresponding to the target detection sound area.

Based on the embodiment corresponding to FIG. 12, in another embodiment of the speech detection apparatus 20 provided in this embodiment of this application:

the generation module 202 is further configured to: generate a first speech detection result when the target speech output signal corresponding to the target detection sound area meets a human voice matching condition, the first speech detection result belonging to the speech detection result, and the first speech detection result indicating that the target speech output signal is a human voice signal; and generate a second speech detection result when the target speech output signal corresponding to the target detection sound area does not meet the human voice matching condition, the second speech detection result belonging to the speech detection result, and the second speech detection result indicating that the target speech output signal is a noise signal.

Based on the embodiment corresponding to FIG. 12, in another embodiment of the speech detection apparatus 20 provided in the embodiments of this application, the speech detection apparatus 20 further includes a determining module 204 and a transmission module 205, where the determining module 204 is configured to: after the generating, by the generation module 202, a speech detection result of the target detection sound area according to the speech output signal corresponding to the target detection sound area, determine a target sound area from the M sound areas according to a speech output signal corresponding to each sound area in the M sound areas when speech detection results corresponding to M sound areas are first speech detection results, the first speech detection result indicating that the speech output signal is the human voice signal, the M sound areas belong to the N sound areas, M being an integer greater than or equal to 1 and less than or equal to N; and the transmission module 205 is configured to transmit a speech output signal corresponding to the target sound area to a calling party.

Based on the embodiment corresponding to FIG. 12, in another embodiment of the speech detection apparatus 20 provided in the embodiments of this application, the speech detection apparatus 20 further includes a determining module 204 and a recognition module 206, where the determining module 204 is configured to: after the generating, by the generation module 202, a speech detection result of the target detection sound area according to the speech output signal corresponding to the target detection sound area, determine a target sound area from the M sound areas according to a speech output signal corresponding to each sound area in the M sound areas when speech detection results corresponding to M sound areas are first speech detection results, the first speech detection result indicating that the speech output signal is the human voice signal, the M sound areas belong to the N sound areas, M being an integer greater than or equal to 1 and less than or equal to N; and the recognition module 206 is configured to perform semantic recognition on a speech output signal corresponding to the target sound area, to obtain a semantic recognition result; and the generation module 202 is further configured to generate dialog response information according to the semantic recognition result.

Based on the embodiment corresponding to FIG. 12, in another embodiment of the speech detection apparatus 20 provided in the embodiments of this application, the speech detection apparatus 20 further includes a determining module 204 and a recognition module 206, where the determining module 204 is configured to: after the generating, by the generation module 202, a speech detection result of the target detection sound area according to the speech output signal corresponding to the target detection sound area, determine a target sound area from the M sound areas according to a speech output signal corresponding to each sound area in the M sound areas when speech detection results corresponding to M sound areas are first speech detection results, the first speech detection result indicating that the speech output signal is the human voice signal, the M sound areas belong to the N sound areas, M being an integer greater than or equal to 1 and less than or equal to N; and the processing module 203 is configured to perform segmentation processing on a speech output signal corresponding to the target sound area, to obtain to-be-recognized audio data;

the recognition module 206 is configured to perform speech recognition on to-be-recognized audio data corresponding to the target sound area, to obtain a speech recognition result; and the generation module 202 is further configured to generate text record information according to a speech recognition result corresponding to the target sound area, the text record information including at least one of translation text or conference record text.

Figure 13:
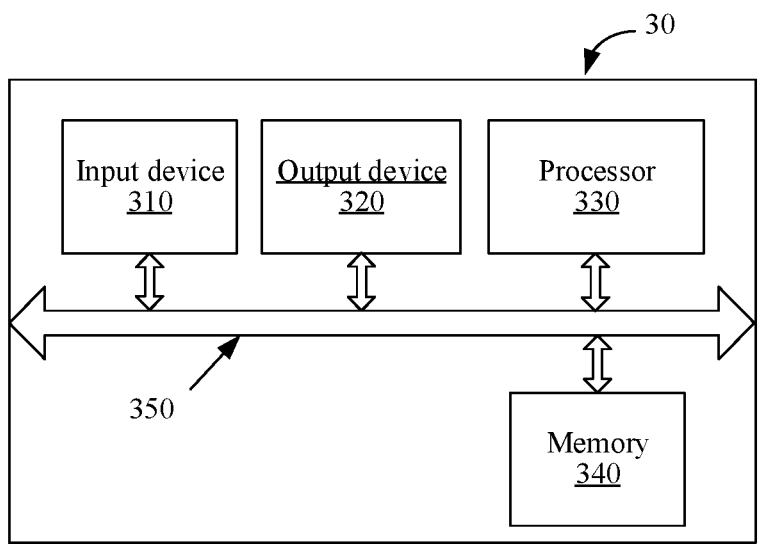
FIG. 13 is a schematic structural diagram of a computer device according to an embodiment of this application.

FIG. 13 is a schematic structural diagram of a computer device 30 according to an embodiment of this application. The computer device 30 may include an input device 310, an output device 320, a processor 330, and a memory 340. The output device in this embodiment of this application may be a display device. The memory 340 may include a ROM and a RAM, and provides an instruction and data to the processor 330. A part of the memory 340 may further include a non-volatile random access memory (NVRAM).

The memory 340 stores the following elements, executable modules or data structures, or a subset thereof, or an extended set thereof:

operation instructions: including various operation instructions, used for implementing various operations; and an operating system: including various system programs, used for implementing various fundamental services and processing hardware-based tasks.

In this embodiment of this application, the processor 330 is configured to:

obtain sound area information corresponding to each sound area in N sound areas, the sound area information including a sound area identifier, a sound pointing angle, and user information, the sound area identifier being used for identifying a sound area, the sound pointing angle being used for indicating a central angle of the sound area, the user information being used for indicating a user existence situation in the sound area, N being an integer greater than 1;

use the sound area as a target detection sound area, and generate a control signal corresponding to the target detection sound area according to sound area information corresponding to the target detection sound area, the control signal being used for performing suppression or retention on a speech input signal, the control signal and the sound area being in a one-to-one correspondence;

process a speech input signal corresponding to the target detection sound area by using the control signal corresponding to the target detection sound area, to obtain a speech output signal corresponding to the target detection sound area, the control signal, the speech input signal, and the speech output signal being in a one-to-one correspondence; and generate a speech detection result of the target detection sound area according to the speech output signal corresponding to the target detection sound area.

The processor 330 controls an operation of the computer device 30, and the processor 330 may also be referred to as a central processing unit (CPU). The memory 340 may include a ROM and a RAM, and provides an instruction and data to the processor 330. A part of the memory 340 may further include an NVRAM. During specific application, all components of the computer device 30 are coupled by using a bus system 350, and besides a data bus, the bus system 350 may further include a power source bus, a control bus, a state signal bus, and the like. However, for clear description, various types of buses in the figure are marked as the bus system 350.

The method disclosed in the foregoing embodiments of this application may be applied to the processor 330, or may be implemented by the processor 330. The processor 330 may be an integrated circuit chip, having a capability of processing a signal. In an implementation process, steps in the foregoing methods can be implemented by using a hardware integrated logical circuit in the processor 330, or by using instructions in a form of software. The foregoing processor 330 may be a general purpose processor, a digital signal processor (DSP), an application-specific integrated circuit (ASIC), a field-programmable gate array (FPGA) or another programmable logic device, a discrete gate or a transistor logic device, or a discrete hardware component. The processor may implement or perform the methods, the steps, and logic block diagrams that are disclosed in the embodiments of this application. The general-purpose processor may be a microprocessor, or the processor may be any conventional processor and the like. The steps of the methods disclosed with reference to the embodiments of this application may be directly performed and completed by using a hardware decoding processor, or may be performed and completed by using a combination of hardware and software modules in the decoding processor. The software module may be stored in a storage medium that is mature in the art, such as a random access memory (RAM), a flash memory, a read-only memory (ROM), a programmable ROM, an electrically erasable programmable memory, or a sound area. The storage medium is located in the memory 340, and the processor 330 reads information in the memory 340 and completes the steps in the foregoing methods in combination with hardware of the processor. For related descriptions of FIG. 13, refer to the related descriptions and effects of the method in FIG. 3. Details are not further described herein.

An embodiment of this application further provides a computer-readable storage medium, the computer-readable storage medium storing a computer program, the computer program, when run on a computer, causing the computer to perform the method described in the foregoing embodiments.

An embodiment of this application further provides a computer program product including a program, the program, when being executed on a computer, causing the computer to perform the method described in the foregoing embodiments.

A person skilled in the art may clearly understand that for convenience and conciseness of description, for specific working processes of the foregoing described system, apparatus and unit, reference may be made to the corresponding processes in the foregoing method embodiments, and details are not described herein.

The foregoing embodiments are merely intended for describing the technical solutions of this application, but not for limiting this application. Although this application is described in detail with reference to the foregoing embodiments, a person of ordinary skill in the art may understand that they may still make modifications to the technical solutions described in the foregoing embodiments or make equivalent replacements to some technical features thereof, and such modifications or replacements will not cause the essence of corresponding technical solutions to depart from the spirit and scope of the technical solutions in the embodiments of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A speech detection method performed by a computer device, the method comprising:

obtaining sound area information corresponding to each sound area in N sound areas including multiple users speaking simultaneously, the sound area information comprising a sound area identifier, a sound pointing angle, and multi-modal user information, the sound area identifier being used for identifying a sound area, the sound pointing angle being used for indicating a central angle of the sound area, the user information being used for indicating a user existence situation in the sound area and an identity of the user, N being an integer greater than 1;

using each sound area as a target detection sound area, and generating a control signal corresponding to the target detection sound area according to the user information of the sound area information corresponding to the target detection sound area, the control signal being used for performing suppression or retention on a speech input signal corresponding to the target detection sound area;

processing speech input signals corresponding to the multiple users in the N sound areas by using respective control signals corresponding to the multiple users in the N sound areas, to obtain multiple speech output signals corresponding to the multiple users in the N sound areas;

generating multiple speech detection results of the multiple users in the N sound areas according to the speech output signals corresponding to the multiple users in the N sound areas;

performing speech recognition and semantic recognition, respectively, on each of the speech output signals corresponding to the multiple users in the N sound areas to obtain a corresponding speech recognition result and a corresponding semantic recognition result based on a corresponding one of the multiple speech detection results; and selecting, among the simultaneously speaking multiple users in the N sound areas, a main speaker based on the identity of the user corresponding to the user information and the speech recognition results and semantic recognition results corresponding to the multiple users in the N sound areas.

2. The speech detection method according to claim 1, wherein the obtaining sound area information corresponding to each sound area in N sound areas comprises:

detecting each sound area in the N sound areas, to obtain a user detection result corresponding to the sound area;

using the sound area as the target detection sound area, and determining user information corresponding to the target detection sound area according to a user detection result corresponding to the target detection sound area;

determining lip motion information corresponding to the target detection sound area according to the user detection result corresponding to the target detection sound area;

obtaining a sound area identifier corresponding to the target detection sound area and a sound pointing angle corresponding to the target detection sound area; and generating the sound area information corresponding to the target detection sound area according to the user information corresponding to the target detection sound area, the lip motion information corresponding to the target detection sound area, the sound area identifier corresponding to the target detection sound area, and the sound pointing angle corresponding to the target detection sound area.

3. The speech detection method according to claim 2, wherein the determining user information corresponding to the target detection sound area according to a user detection result corresponding to the target detection sound area comprises:

determining a first identity as the user information when the user detection result corresponding to the target detection sound area is that a recognizable user exists in the target detection sound area;

determining a second identity as the user information when the user detection result corresponding to the target detection sound area is that no user exists in the target detection sound area; and determining a third identity as the user information when the user detection result corresponding to the target detection sound area is that an unknown user exists in the target detection sound area.

4. The speech detection method according to claim 2, wherein the determining lip motion information corresponding to the target detection sound area according to the user detection result corresponding to the target detection sound area comprises:

determining a first motion identifier as the lip motion information when the user detection result corresponding to the target detection sound area is that a user with lip motion exists in the target detection sound area;

determining a second motion identifier as the lip motion information when the user detection result corresponding to the target detection sound area is that a user exists in the target detection sound area and the user does not have lip motion; and determining a third motion identifier as the lip motion information when the user detection result corresponding to the target detection sound area is that no user exists in the target detection sound area.

5. The speech detection method according to claim 2, wherein the generating a control signal corresponding to the target detection sound area according to sound area information corresponding to the target detection sound area comprises:

generating a first control signal when the user information corresponding to the target detection sound area indicates that no user exists in the target detection sound area, the first control signal being used for performing suppression on the speech input signal; and generating the first control signal when the user information corresponding to the target detection sound area indicates that a user exists in the target detection sound area and the user does not have lip motion;

generating a second control signal when the user information corresponding to the target detection sound area indicates that a user exists in the target detection sound area and the user has lip motion, the second control signal being used for performing retention on the speech input signal; and generating the first control signal or the second control signal according to an original audio signal when the user information corresponding to the target detection sound area indicates that a user exists in the target detection sound area and a lip motion situation of the user is unknown.

6. The speech detection method according to claim 1, wherein the generating a control signal corresponding to the target detection sound area according to sound area information corresponding to the target detection sound area comprises:

generating a first control signal when the user information corresponding to the target detection sound area indicates that no user exists in the target detection sound area, the first control signal being used for performing suppression on the speech input signal; and generating a second control signal when the user information corresponding to the target detection sound area indicates that a user exists in the target detection sound area, the second control signal being used for performing retention on the speech input signal.

7. The speech detection method according to claim 1, wherein the generating a control signal corresponding to the target detection sound area according to sound area information corresponding to the target detection sound area comprises:

generating the control signal corresponding to the target detection sound area according to sound area information corresponding to the target detection sound area by using a preset algorithm, the preset algorithm being one of an adaptive beamforming algorithm, a blind source separation algorithm, or a deep learning-based speech separation algorithm.

8. The speech detection method according to claim 1, wherein the generating multiple speech detection results of the N sound areas according to the speech output signals corresponding to the N sound areas comprises:

determining a signal power corresponding to a target detection sound area according to the speech output signal corresponding to the target detection sound area, wherein the signal power is a signal power of the speech output signal at a time-frequency point;

determining an estimated signal-to-noise ratio corresponding to the target detection sound area according to the signal power corresponding to the target detection sound area;

determining an output signal weighted value corresponding to the target detection sound area according to the estimated signal-to-noise ratio corresponding to the target detection sound area, the output signal weighted value being a weighted result of the speech output signal at the time-frequency point;

determining a target speech output signal corresponding to the target detection sound area according to the output signal weighted value corresponding to the target detection sound area and the speech output signal corresponding to the target detection sound area; and determining the speech detection result corresponding to the target detection sound area according to the target speech output signal corresponding to the target detection sound area.

9. The speech detection method according to claim 8, wherein the generating multiple speech detection results of the N sound areas according to the speech output signals corresponding to the N sound areas comprises:

generating a first speech detection result when the target speech output signal corresponding to the target detection sound area meets a human voice matching condition, the first speech detection result indicating that the target speech output signal is a human voice signal; and generating a second speech detection result when the target speech output signal corresponding to the target detection sound area does not meet the human voice matching condition, the second speech detection result indicating that the target speech output signal is a noise signal.

10. The speech detection method according to claim 1, wherein the method further comprises:

determining a target sound area from the N sound areas corresponding to the main speaker; and transmitting the speech output signal corresponding to the target sound area to a calling party.

11. The speech detection method according to claim 1, wherein the method further comprises:

generating dialog response information according to the semantic recognition result corresponding to the main speaker.

12. The speech detection method according to claim 1, wherein the method further comprises:

generating text record information according to the speech recognition result corresponding to the main speaker, the text record information comprising at least one of translation text or conference record text.

13. A computer device, comprising: a memory, a transceiver, a processor, and a bus system, the memory being configured to store a program, the bus system being configured to connect the memory and the processor, to cause the memory and the processor to perform communication, and the processor being configured to execute the program in the memory, and perform a speech detection method comprising:

obtaining sound area information corresponding to each sound area in N sound areas including multiple users speaking simultaneously, the sound area information comprising a sound area identifier, a sound pointing angle, and multi-modal user information, the sound area identifier being used for identifying a sound area, the sound pointing angle being used for indicating a central angle of the sound area, the user information being used for indicating a user existence situation in the sound area and an identity of the user, N being an integer greater than 1;

using each sound area as a target detection sound area, and generating a control signal corresponding to the target detection sound area according to the user information of the sound area information corresponding to the target detection sound area, the control signal being used for performing suppression or retention on a speech input signal corresponding to the target detection sound area;

processing speech input signals corresponding to the multiple users in the N sound areas by using respective control signals corresponding to the multiple users in the N sound areas, to obtain multiple speech output signals corresponding to the multiple users in the N sound areas;

generating multiple speech detection results of the multiple users in the N sound areas according to the speech output signals corresponding to the multiple users in the N sound areas;

performing speech recognition and semantic recognition, respectively, on each of the speech output signals corresponding to the multiple users in the N sound areas to obtain a corresponding speech recognition result and a corresponding semantic recognition result based on a corresponding one of the multiple speech detection results; and selecting, among the simultaneously speaking multiple users in the N sound areas, a main speaker based on the identity of the user corresponding to the user information and the speech recognition results and semantic recognition results corresponding to the multiple users in the N sound areas.

14. The computer device according to claim 13, wherein the obtaining sound area information corresponding to each sound area in N sound areas comprises:

detecting each sound area in the N sound areas, to obtain a user detection result corresponding to the sound area;

using the sound area as the target detection sound area, and determining user information corresponding to the target detection sound area according to a user detection result corresponding to the target detection sound area;

determining lip motion information corresponding to the target detection sound area according to the user detection result corresponding to the target detection sound area;

obtaining a sound area identifier corresponding to the target detection sound area and a sound pointing angle corresponding to the target detection sound area; and generating the sound area information corresponding to the target detection sound area according to the user information corresponding to the target detection sound area, the lip motion information corresponding to the target detection sound area, the sound area identifier corresponding to the target detection sound area, and the sound pointing angle corresponding to the target detection sound area.

15. The computer device according to claim 13, wherein the generating a control signal corresponding to the target detection sound area according to sound area information corresponding to the target detection sound area comprises:

generating a first control signal when the user information corresponding to the target detection sound area indicates that no user exists in the target detection sound area, the first control signal being used for performing suppression on the speech input signal; and generating a second control signal when the user information corresponding to the target detection sound area indicates that a user exists in the target detection sound area, the second control signal being used for performing retention on the speech input signal.

16. The computer device according to claim 13, wherein the generating a control signal corresponding to the target detection sound area according to sound area information corresponding to the target detection sound area comprises:

generating the control signal corresponding to the target detection sound area according to sound area information corresponding to the target detection sound area by using a preset algorithm, the preset algorithm being one of an adaptive beamforming algorithm, a blind source separation algorithm, or a deep learning-based speech separation algorithm.

17. The computer device according to claim 13, wherein the generating multiple speech detection results of the N sound areas according to the speech output signals corresponding to the N sound areas, further including comprises:

determining a signal power corresponding to a target detection sound area according to the speech output signal corresponding to the target detection sound area, wherein the signal power is a signal power of the speech output signal at a time-frequency point;

determining an estimated signal-to-noise ratio corresponding to the target detection sound area according to the signal power corresponding to the target detection sound area;

determining an output signal weighted value corresponding to the target detection sound area according to the estimated signal-to-noise ratio corresponding to the target detection sound area, the output signal weighted value being a weighted result of the speech output signal at the time-frequency point;

determining a target speech output signal corresponding to the target detection sound area according to the output signal weighted value corresponding to the target detection sound area and the speech output signal corresponding to the target detection sound area; and determining the speech detection result corresponding to the target detection sound area according to the target speech output signal corresponding to the target detection sound area.

18. A non-transitory computer-readable storage medium comprising instructions that, when executed by a processor of a computer device, cause the computer device to perform a speech detection method including:

obtaining sound area information corresponding to each sound area in N sound areas including multiple users speaking simultaneously, the sound area information comprising a sound area identifier, a sound pointing angle, and multi-modal user information, the sound area identifier being used for identifying a sound area, the sound pointing angle being used for indicating a central angle of the sound area, the user information being used for indicating a user existence situation in the sound area and an identity of the user, N being an integer greater than 1;

using each sound area as a target detection sound area, and generating a control signal corresponding to the target detection sound area according to the user information of the sound area information corresponding to the target detection sound area, the control signal being used for performing suppression or retention on a speech input signal corresponding to the target detection sound area;

processing speech input signals corresponding to the multiple users in the N sound areas by using respective control signals corresponding to the multiple users in the N sound areas, to obtain multiple speech output signals corresponding to the multiple users in the N sound areas;

generating multiple speech detection results of the multiple users in the N sound areas according to the speech output signals corresponding to the multiple users in the N sound areas;

performing speech recognition and semantic recognition, respectively, on each of the speech output signals corresponding to the multiple users in the N sound areas to obtain a corresponding speech recognition result and a corresponding semantic recognition result based on a corresponding one of the multiple speech detection results; and selecting, among the simultaneously speaking multiple users in the N sound areas, a main speaker based on the identity of the user corresponding to the user information and the speech recognition results and semantic recognition results corresponding to the multiple users in the N sound areas.

19. The non-transitory computer-readable storage medium according to claim 18, wherein the obtaining sound area information corresponding to each sound area in N sound areas comprises:

detecting each sound area in the N sound areas, to obtain a user detection result corresponding to the sound area;

using the sound area as the target detection sound area, and determining user information corresponding to the target detection sound area according to a user detection result corresponding to the target detection sound area;

determining lip motion information corresponding to the target detection sound area according to the user detection result corresponding to the target detection sound area;

obtaining a sound area identifier corresponding to the target detection sound area and a sound pointing angle corresponding to the target detection sound area; and generating the sound area information corresponding to the target detection sound area according to the user information corresponding to the target detection sound area, the lip motion information corresponding to the target detection sound area, the sound area identifier corresponding to the target detection sound area, and the sound pointing angle corresponding to the target detection sound area.

20. The non-transitory computer-readable storage medium according to claim 18, wherein the generating a control signal corresponding to the target detection sound area according to sound area information corresponding to the target detection sound area comprises:

generating a first control signal when the user information corresponding to the target detection sound area indicates that no user exists in the target detection sound area, the first control signal being used for performing suppression on the speech input signal; and generating a second control signal when the user information corresponding to the target detection sound area indicates that a user exists in the target detection sound area, the second control signal being used for performing retention on the speech input signal.

\* \* \* \* \*